(12) United States Patent
Ito et al.

(10) Patent No.: US 12,056,297 B2
(45) Date of Patent: *Aug. 6, 2024

(54) ELECTRONIC PEN CARTRIDGE AND ELECTRONIC PEN

(71) Applicant: Wacom Co., Ltd., Saitama (JP)

(72) Inventors: Masamitsu Ito, Saitama (JP); Hidetaka Takiguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,924

(22) Filed: May 12, 2023

(65) Prior Publication Data
US 2023/0280846 A1    Sep. 7, 2023

Related U.S. Application Data

(63) Continuation of application No. 16/997,750, filed on Aug. 19, 2020, now Pat. No. 11,687,172, which is a (Continued)

(30) Foreign Application Priority Data

Apr. 17, 2018   (JP) .................................. 2018-079003

(51) Int. Cl.
*G06F 3/038*     (2013.01)
*G06F 3/0354*    (2013.01)

(52) U.S. Cl.
CPC .......... *G06F 3/03545* (2013.01); *G06F 3/038* (2013.01); *G06F 3/0383* (2013.01)

(58) Field of Classification Search
None
See application file for complete search history.

(56) References Cited

U.S. PATENT DOCUMENTS 9,884,510  B1     2/2018  Foster
2007/0014490  A1  1/2007  Silverbrook et al.
(Continued)

FOREIGN PATENT DOCUMENTS

JP    2011186803 A    9/2011
JP    2013161307 A    8/2013
(Continued)

OTHER PUBLICATIONS

Extended European Search Report, dated Apr. 6, 2021, for European Application No. 19787561.0-1216. (9 pages).
(Continued)

*Primary Examiner* — Xuyang Xia
(74) *Attorney, Agent, or Firm* — Seed IP Law Group LLP

(57) ABSTRACT

An electronic pen cartridge includes a pen tip that is configured to protrude outside of an electronic pen electronic pen casing through an opening of the electronic pen casing, an electronic circuit that transfers signals to a position detecting sensor, and a first connector that is joined to a second connector disposed in the electronic pen casing. The first connector includes plural terminals insulated from each other, and each of the terminals is electrically connected to the electronic circuit. The first connector and the second connector are joined through insertion of a fitting protrusion of a first one of the first connector and the second connector into a fitting recess of a second one of the first connector and the second connector in an axis center direction of the electronic pen casing, and circular annular conductor contacts are included in the first connector or the second connector.

22 Claims, 12 Drawing Sheets

Related U.S. Application Data continuation of application No. PCT/JP2019/001937, filed on Jan. 23, 2019.

(56) References Cited

U.S. PATENT DOCUMENTS

| | | |
|---|---|---|
| 2011/0219892 A1 | 9/2011 | Fukushima et al. |
| 2013/0199311 A1 | 8/2013 | Horie et al. |
| 2014/0029156 A1* | 1/2014 | Obata ............... G06F 3/046 361/270 |
| 2014/0379438 A1 | 12/2014 | Kameda et al. |
| 2016/0154484 A1* | 6/2016 | Kampf ............ G06F 1/3259 345/179 |
| 2017/0277286 A1* | 9/2017 | Chiu ............... G06F 3/0346 |
| 2017/0322643 A1 | 11/2017 | Eguchi |
| 2018/0011557 A1 | 1/2018 | Katsurahira et al. |

FOREIGN PATENT DOCUMENTS

| | | |
|---|---|---|
| JP | 5869193 B1 | 2/2016 |
| JP | 2016134168 A | 7/2016 |
| WO | WO 2016121477 A1 | 8/2016 |
| WO | WO 2016158418 A1 | 10/2016 |

OTHER PUBLICATIONS

International Search Report, mailed Apr. 9, 2019, for International Application No. PCT/JP2019/001937. (4 pages) (with English translation).

\* cited by examiner

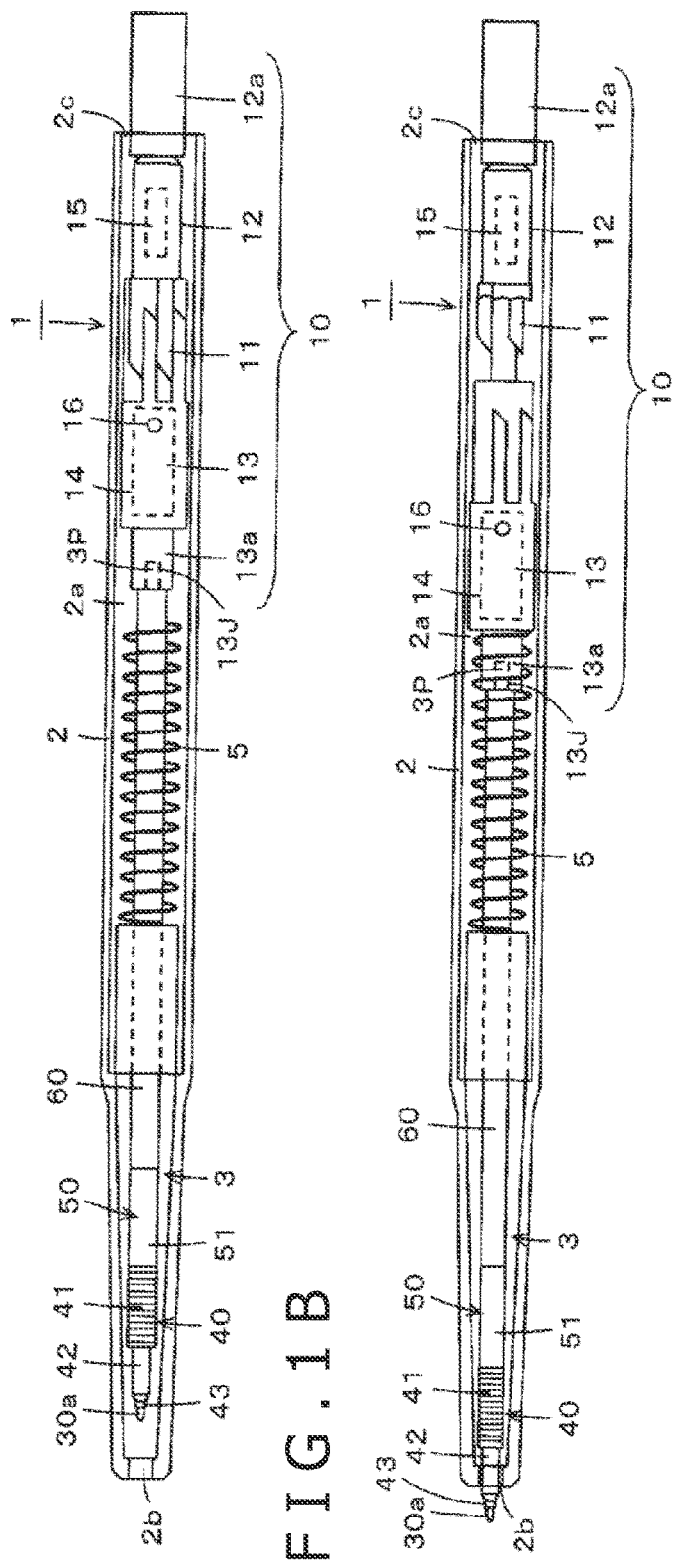

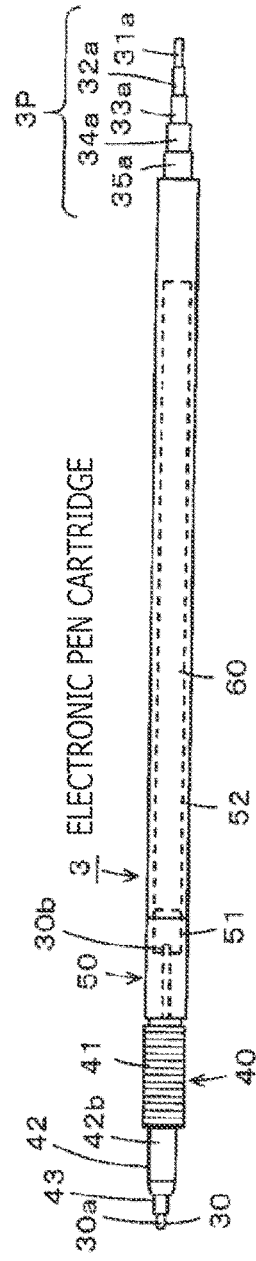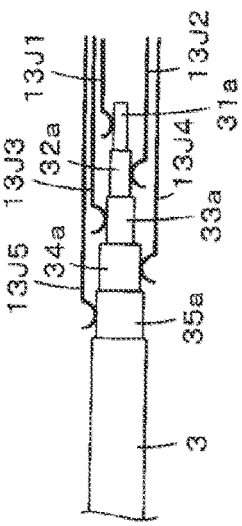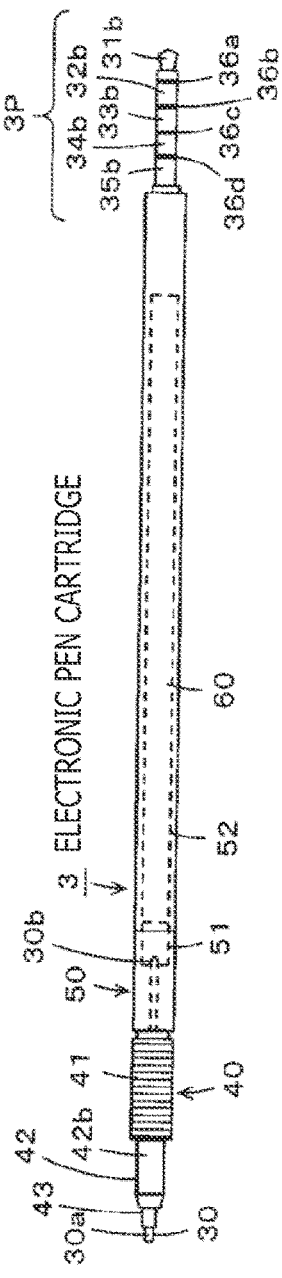
FIG. 2A
FIG. 2B
FIG. 2C

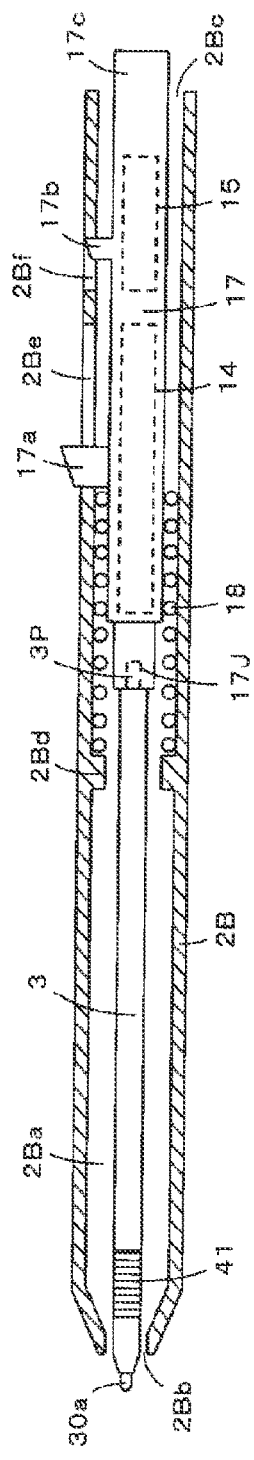

ELECTRONIC PEN CARTRIDGE AND ELECTRONIC PEN

BACKGROUND

Technical Field

This disclosure relates to an electronic pen used with a position detecting device including a position detecting sensor and an electronic pen cartridge used for this electronic pen.

Description of the Related Art

In recent years, electronic pens have been becoming ones of a cartridge system for diversification of the overall shape (outer casing) (emphasis on design). In order to realize this, there has been proposed an electronic pen cartridge having a position indication function, a writing pressure detection function, and so forth with respect to a position detecting sensor as major functions of an electronic pen (refer to Patent Document 1 (WO 2016/158418) and so forth). This kind of electronic pen can be configured by only housing and incorporating this electronic pen cartridge in a hollow part of a tubular outer casing. Therefore, the flexibility in the design of the outer casing of the electronic pen increases and diversification of the electronic pen becomes easy. In addition, replacement becomes easy as with a refill of a ballpoint pen and so forth, which provides great convenience.

Meanwhile, in the electronic pens of recent years, reduction in the thickness, which is convenient for carrying, has been advancing. In addition, increase in functions has also been advancing, such as a function of transmitting a pen ID (identification information) unique to each electronic pen and so forth to a position detecting device including a position detecting sensor by using communication means formed of a wireless communication module or the like of the Bluetooth (registered trademark) standard, for example (refer to Patent Document 2 (Japanese Patent Laid-Open No. 2016-134168)).

PRIOR ART DOCUMENT

Patent Documents

Patent Document 1: WO 2016/158418
Patent Document 2: Japanese Patent Laid-Open No. 2016-134168

BRIEF SUMMARY

Technical Problems

For the above-described trend toward the electronic pens of recent years, there are demands for provision of electronic pens of a cartridge system and realization of reduction in the thickness and increase in functions.

To realize increase in functions, the electronic pen needs to be equipped with a wireless communication module, an IC (Integrated Circuit) that configures a transmission control circuit for transmitting a pen ID and so forth by using this wireless communication module, a power supply (primary battery and secondary battery), and so forth. As above, the multi-functionalized part of the electronic pen includes plural constituent parts. Therefore, when housing all of them in an electronic pen cartridge is attempted, the electronic pen cartridge becomes thicker. Thus, the outer casing of the electronic pen becomes further thicker and it becomes difficult to reduce the thickness of the electronic pen.

An electronic pen is conceivable that keeps reduction in the thickness by being equipped with electronic circuit parts in such a manner that the electronic circuit parts are divided into electronic circuit parts in an electronic pen cartridge and electronic circuit parts outside the electronic pen cartridge. In this case, the electronic circuit mounted in the electronic pen cartridge needs to be electrically connected to the electronic circuit mounted outside. In this case, it is essential to prevent the occurrence of electrical trouble at the connecting part between the electronic circuit in the electronic pen cartridge and the outside electronic circuit.

This disclosure intends to provide an electronic pen that can solve the above problems and an electronic pen cartridge used for this electronic pen.

Technical Solution

In order to solve the above-described problems, an electronic pen cartridge is housed in an electronic pen casing in which an opening is made on a first side at one end of the electronic pen casing in an axis center direction of the electronic pen casing is provided. The electronic pen cartridge includes: a pen tip configured to protrude outside of the electronic pen electronic pen casing through the opening; an electronic circuit which, in operation, transfers signals to a position detecting sensor; and a first connector that is disposed on a second side of the electronic pen casing in the axis center direction of the electronic pen casing and is joined to a second connector disposed on second side of the electronic pen casing. The first connector includes plural first terminals insulated from each other, and each of the plural first terminals is electrically connected to the electronic circuit. The first connector and the second connector are joined through insertion of a fitting protrusion of a first one of the first connector and the second connector into a fitting recess of a second one of the first connector and the second connector in the axis center direction of the electronic pen casing, and circular annular conductor contacts are included in the rear-end-part connector or the second connector.

Furthermore, in order to solve the above-described problems, an electronic pen in which an electronic pen cartridge is housed in a hollow part of an electronic pen casing in which an opening is made on a first side at one end of the electronic pen casing in an axis center direction of the electronic pen casing is provided. The electronic pen cartridge includes: a pen tip configured to protrude to outside of the electronic pen through the opening; a first electronic circuit which, in operation, transfers signals to a position detecting sensor; and a first connector disposed on a second side of the electronic pen casing in the axis center direction of the electronic pen casing and is joined to a second connector disposed on the second side of the electronic pen casing the first connector includes plural first terminals insulated from each other, and each of the plural first terminals is electrically connected to the first electronic circuit; the electronic pen casing includes: the second connector, and the second connector includes plural second terminals insulated from each other; a second electronic circuit electrically connected to the plural second terminals of the second connector; and a power supply that provides a supply voltage to the second electronic circuit; and the first connector and the second connector are joined through insertion of a fitting protrusion of a first one of the first connector and the second connector into a fitting recess of a second one of the first connector and the second connector in the axis center direction of the electronic pen casing, and the plural first terminals or the plural second terminals include circular annular conductor contacts.

The electronic pen cartridge with the above-described configuration includes the first connector including the plural first terminals electrically connected to its own electronic circuit (first electronic circuit). Furthermore, on the electronic pen casing side, the second electronic circuit that can configure a multi-functionalized part, for example, is disposed. In addition, the second connector is disposed to be electrically connected to this second electronic circuit.

The electronic pen cartridge is housed in the electronic pen casing through joining of the first connector to the second connector disposed on the second side of the electronic pen casing, so that the electronic pen is configured.

Therefore, in the electronic pen with the above-described configuration, because the second electronic circuit that configures the multi-functionalized part can be disposed on the electronic pen casing side, only the major part as the electronic pen, such as position indication function and writing pressure detection function of the electronic pen, can be mounted in the electronic pen cartridge and reduction in the thickness of the electronic pen cartridge can be kept. For this reason, it becomes possible to keep reduction in the thickness and increase in functions in the electronic pen and diversification of the design of the electronic pen.

Moreover, according to the electronic pen and the electronic pen cartridge with the above-described configuration, the following effect is also achieved.

Normally, at the time of writing with use of an electronic pen, the user makes writing input while rotating the electronic pen around the axis center direction in many cases. When writing input is made while the electronic pen is rotated as above, rotational torque is generated between the electronic pen cartridge and the electronic pen casing. Thus, the rotational torque is applied also to the electrical connecting part between the electronic pen cartridge and the electronic pen casing and therefore possibly electrical non-connection occurs in the electrical connecting part between the electronic pen cartridge and the electronic pen casing due to the above-described rotational torque.

However, the electrical connection between the first connector of the electronic pen cartridge with the above-described configuration and the second connector on the electronic pen casing side is made by the terminals that are included in either of the first connector and the second connector and have the circular annular conductor contact parts. Therefore, electrical non-connection can be avoided even when the rotational torque is generated at the time of use of the electronic pen.

BRIEF DESCRIPTION OF THE SEVERAL VIEWS OF THE DRAWINGS

FIGS. 1A and 1B illustrate diagrams for explaining a configuration example of an electronic pen according to an embodiment of this disclosure.

FIGS. 2A, 2B, and 2C illustrate diagrams for explaining a configuration example of an electronic pen cartridge according to an embodiment of this disclosure.

FIG. 11 is a diagram for explaining a configuration example of still another embodiment of the electronic pen according to this disclosure.

DETAILED DESCRIPTION

Modes for Carrying Out the Invention

Figure 3:
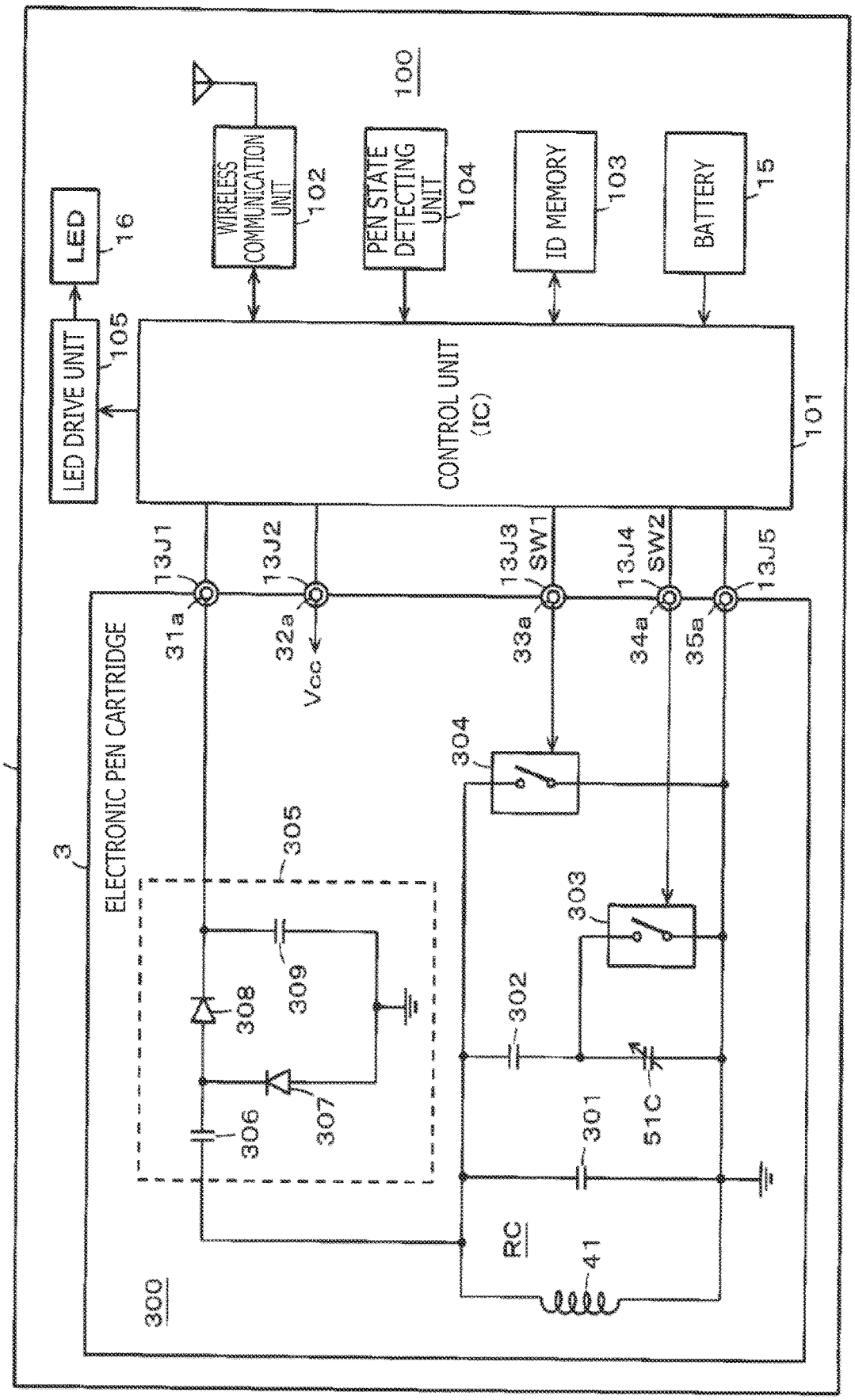
FIG. 3 is a block diagram for explaining a configuration example of an electronic circuit of the electronic pen according to an embodiment of this disclosure.

Embodiments of an electronic pen and embodiments of an electronic pen cartridge according to this disclosure will be described below with reference to the drawings.

FIGS. 1A and 1B illustrate diagrams depicting a configuration example of an electronic pen according to an embodiment of this disclosure. This example is an electronic pen of an electromagnetic induction system. In an electronic pen 1 of this embodiment, a configuration of a cartridge system is employed and a configuration is employed in which major functions of the electronic pen, such as position indication function and writing pressure detection function with respect to a position detecting sensor, are housed in an electronic pen cartridge 3. Furthermore, in this embodiment, the electronic pen cartridge 3 is allowed to be attached and detached to and from a casing 2.

The electronic pen 1 of this embodiment has a configuration of a knock system in which, as depicted in FIGS. 1A and 1B, the electronic pen cartridge 3 is housed in a hollow part 2a of the tubular casing 2 (hereinafter, referred to as pen casing 2) and the pen tip side of the electronic pen cartridge 3 is caused to protrude and retract from the side of an opening 2b at one end of the pen casing 2 in the longitudinal direction by a knock cam mechanism 10.

FIG. 1A depicts the state in which the whole of the electronic pen cartridge 3 is housed in the hollow part 2a of the pen casing 2, and FIG. 1B depicts the state in which the pen tip side of the electronic pen cartridge 3 protrudes from the opening 2b of the pen casing 2 due to the knock cam mechanism 10. In the example of FIGS. 1A and 1B, the pen casing 2 of the electronic pen is composed of a transparent synthetic resin and is depicted as the state in which the inside thereof is visible in a see-through manner.

In the electronic pen 1 of this embodiment, the thickness and the length in the axis center direction regarding the pen tip and cartridge casing of the electronic pen cartridge 3 are set equal to those of the refill of the commercially-available ballpoint pen. Therefore, the electronic pen 1 of this embodiment is configured to allow the refill of the commercially-available knock-system ballpoint pen to be mounted instead of the electronic pen cartridge 3.

The pen casing 2 and the knock cam mechanism 10 set in the pen casing 2 are given the same configuration as outer casing and knock cam function of the well-known commercially-available knock-system ballpoint pen. In addition, the dimension relationship is also configured to be the same.

As depicted in FIGS. 1A and 1B, the knock cam mechanism 10 is given a well-known configuration in which a cam main body 11, a knock bar 12, and a rotating element 13 are combined. The cam main body 11 is formed on the inner wall surface of the tubular pen casing 2. In the knock bar 12, an end part 12a is allowed to protrude from an opening 2c on the opposite side to the pen tip side of the pen casing 2 so that knock operation by a user can be accepted.

The rotating element 13 has a cartridge joining part 13a including a connector jack 13J (first connector) into which a connector plug 3P (second connector, see dashed lines in FIGS. 1A and 1B) disposed at the rear end part of the electronic pen cartridge 3 on the opposite side to the pen tip side is fitted. The connector plug 3P is an example of a rear-end-part connector and the connector jack 13J is an example of a joining connector.

Furthermore, in this example, in the rotating element 13, a printed circuit board 14 (see dashed lines in FIGS. 1A and 1B) on which an electronic circuit including an IC, wireless communication circuit, ID memory, and so forth to be described later are mounted is disposed. In addition, in the knock bar 12, a battery 15 (see dashed lines in FIGS. 1A and 1B) that provides a supply voltage to the electronic circuit of the printed circuit board 14 is disposed as described later.

When the end part 12a of the knock bar 12 is pressed down in the state of FIG. 1A, the electronic pen cartridge 3 is locked to the state of FIG. 1B in the pen casing 2 by the knock cam mechanism 10, which makes the state in which the pen tip side of the electronic pen cartridge 3 protrudes from the opening 2b of the pen casing 2. Then, when the end part 12a of the knock bar 12 is pressed down again from this state of FIG. 1B, the lock state is released by the knock cam mechanism 10 and the position of the electronic pen cartridge 3 in the pen casing 2 returns to the state of FIG. 1A by a spring 5 for return. The detailed configuration of the knock cam mechanism 10 and operation thereof are well known and therefore description thereof is omitted here.

Embodiment of Electronic Pen Cartridge

FIGS. 2A, 2B, and 2C illustrates diagrams depicting a configuration example of the electronic pen cartridge 3 of this embodiment. FIG. 2A is a first example of the electronic pen cartridge 3 of this embodiment. Furthermore, FIG. 2C depicts a second example of the electronic pen cartridge 3 of this embodiment. Here, between the first example and the second example, only the configuration of the connector plug 3P is different and the other part has almost the same configuration.

As depicted in FIGS. 2A and 2C, the electronic pen cartridge 3 of this embodiment is composed of a core body 30, a component 40 for signal transmission, a holder part 50 that holds a writing pressure detecting circuit 51 and holds a printed circuit board 52 on which an electronic circuit is disposed, a cartridge casing 60 having a function of housing and protecting the writing pressure detecting circuit 51 and the printed circuit board 52 held by the holder part 50, and a connector plug 3P as an example of the rear-end-part connector disposed at the rear end part of the cartridge casing 60 on the opposite side to the core body side.

The core body 30 is a bar-shaped component that is composed of a resin material that is comparatively hard and has elasticity in this example, for example, POM (Polyoxymethylene), and has a circular sectional shape. The diameter thereof is set to approximately 1 mm, for example.

The component 40 for signal transmission is composed of a coil 41 that configures a resonant circuit for transmitting and receiving signals with a position detecting device by the electromagnetic induction system, a magnetic body core around which the coil 41 is wound, a ferrite core 42 in this example, and a core pipe component 43 fitted and fixed in a through-hole formed in the axis center direction at the central position of the ferrite core 42. The core pipe component 43 is fitted and fixed in the ferrite core 42 in the state of protruding toward the pen tip side relative to the ferrite core 42 in the axis center direction as depicted in FIGS. 1A and 1B and FIGS. 2A, 2B, and 2C.

Furthermore, the inner diameter of the core pipe component 43 is set larger than the diameter of the core body 30 and the core body 30 is inserted in the core pipe component 43 and is fitted to the writing pressure detecting circuit 51. In this case, a tip 30a of the core body 30 in the axis center direction is made to protrude relative to the core pipe component 43 as the pen tip. In addition, the other end 30b of the core body 30 in the axis center direction is fitted to the writing pressure detecting circuit 51. Due to this, the pressure (writing pressure) applied to the tip 30a on the pen tip side of the core body 30 is applied to the writing pressure circuit 51.

The writing pressure detecting circuit 51 is formed of what uses a mechanism that changes the capacitance of a capacitance-variable capacitor according to the applied pressure (writing pressure), for example (refer to Patent Document (Japanese Patent Laid-Open No. 2011-186803), for example). As the writing pressure detecting circuit 51, one in which a capacitance-variable capacitor is configured by a semiconductor chip formed of a MEMS (Micro Electro Mechanical Systems) element (refer to Patent Document (Japanese Patent Laid-Open No. 2013-161307), for example) may be used. The configuration of the writing pressure detecting circuit 51 is not limited to that of this example.

The holder part 50 is composed of a resin material, for example, and is fitted to the ferrite core 42 of the component 40 for signal transmission and includes a tubular part (diagrammatic representation is omitted) that holds the writing pressure detecting circuit 51. Furthermore, the holder part 50 includes a printed circuit board placement pedestal (diagrammatic representation is omitted) that holds the printed circuit board 52 placed thereon.

The cartridge casing 60 is formed of a pipe-shaped component composed of a hard material, a pipe-shaped component composed of a metal in this example, and configures a circuit part protecting component that protects an electrical circuit configuring part of the writing pressure detecting circuit 51 and the printed circuit board 52 held by the holder part 50.

Specifically, the cartridge casing 60 and the holder part 50 are joined in the axis center direction in the state in which part of the tubular part that holds the writing pressure detecting circuit 51 and the printed circuit board placement pedestal in the holder part 50 are housed in a hollow part of the cartridge casing 60.

Furthermore, the connector plug 3P is disposed at the rear end part of the cartridge casing 60 on the opposite side to the side of joining with the component 40 for signal transmission in the axis center direction. The connector plug 3P is electrically connected to the electronic circuit formed on the printed circuit board 52 and includes plural terminal parts, in this example, five terminal parts 31a, 32a, 33a, 34a, and 35a, insulated from each other.

In the electronic pen cartridge 3 of the first example of FIG. 2A, the five terminal parts 31a, 32a, 33a, 34a, and 35a of the connector plug 3P are configured as follows. Specifically, in this example, the terminal part 31a is composed of a conductor metal that configures a core bar at the center. Furthermore, in the example of FIG. 2A, the connector plug 3P is configured in such a manner that the circular cylindrical terminal parts 32a, 33a, 34a, and 35a that each have an inner wall surface on which an insulating layer is formed are concentrically combined with the bar-shaped conductor metal of the terminal part 31a.

In this case, the terminal part 31a of the conductor metal that configures the core bar at the center is employed as the tip part in the axis center direction and a predetermined length of the annular circumferential surface thereof in the axis center direction and the tip thereof are made to be exposed. In addition, the circular cylindrical terminal parts 32a, 33a, 34a, and 35a are each set in such a manner that a predetermined length of the annular circumferential surface thereof in the axis center direction is exposed. That is, the five terminal parts 31a, 32a, 33a, 34a, and 35a of the connector plug 3P are in the state in which circular annular conductor contact parts are exposed at different positions in the axis center direction. The terminal part 31a has a circular columnar shape and the annular circumferential side surface and tip part thereof configure the conductor contact part.

When the connector plug 3P is inserted into a fitting recess of the connector jack 13J made in the rotating element 13 disposed in the hollow part 2a of the pen casing 2, as depicted in FIG. 2B, the connector plug 3P becomes in a state of being electrically connected to each of five contact terminals 13J1, 13J2, 13J3, 13J4, and 13J5 disposed in the connector jack 13J. Each of the five contact terminals 13J1, 13J2, 13J3, 13J4, and 13J5 is composed of an electrically-conductive elastic metal and is connected to the electronic circuit disposed on the printed circuit board 14.

The connector plug 3P is inserted into the connector jack 13J and is joined thereto in this manner and thereby the electronic circuit formed on the printed circuit board 52 of the electronic pen cartridge 3 and the electronic circuit on the printed circuit board 14 set in the rotating element 13 disposed in the hollow part 2a of the pen casing 2 are electrically connected.

At this time, the circular annular conductor contact part of the terminal parts 31a, 32a, 33a, 34a, and 35a of the connector plug 3P are connected to each of the contact terminals 13J1, 13J2, 13J3, 13J4, and 13J5 of the connector jack 13J. Therefore, even when the electronic pen cartridge 3 rotates around a center line in the axis center direction, the electrical connection is always kept and electrical non-contact can be avoided.

In the electronic pen cartridge 3 of the second example of FIG. 2C, five terminal parts 31b, 32b, 33b, 34b, and 35b of the connector plug 3P are configured as follows. The connector plug 3P of this example has a configuration similar to a pin plug for audio (for example, 5-pole pin plug with a noise cancel function). In this example, the five terminal parts 31b, 32b, 33b, 34b, and 35b are in a state in which circular annular conductor contact parts with the same diameter are exposed at different positions in the axis center direction.

Specifically, the terminal part 31b at the tip in the five terminal parts 31b, 32b, 33b, 34b, and 35b is employed as a chip terminal. The middle three terminal parts 32b, 33b, and 34b are each employed as a ring terminal insulated from the other terminal parts by insulation rings 36a, 36b, 36c, and 36d. The terminal part 35b on the root side of the electronic pen cartridge 3 is employed as a sleeve terminal.

The connector jack 13J joined to the connector plug 3P of the electronic pen cartridge 3 of this FIG. 2C also includes five contact terminals that contact each of the circular annular conductor contact parts of the five terminal parts 31b, 32b, 33b, 34b, and 35b and form an electrical connection similarly to FIG. 2B.

In this embodiment, the electronic pen cartridge 3 is given a configuration of a cartridge regarded as the same as the refill of the ballpoint pen as the outer shape through joining of the component 40 for signal transmission, the holder part 50, and the cartridge casing 60 in the axis center direction in the above-described manner.

Internal Circuit Configuration Example of Electronic Pen 1

FIG. 3 is a diagram depicting a configuration example of an electronic circuit (first electronic circuit) 300 formed on the printed circuit board 52 of the electronic pen cartridge 3 in the electronic pen 1 of this embodiment and an electronic circuit (second electronic circuit) 100 formed, in this example, on the printed circuit board 14 disposed in the rotating element 13 of the knock cam mechanism circuit 10 in the hollow part of the pen casing 2 separately from the electronic pen cartridge 3.

As depicted in FIG. 3, in the electronic circuit (first electronic circuit) 300 formed on the printed circuit board 52 of the electronic pen cartridge 3, the coil 41 wound around the ferrite core 42 is connected in parallel to a capacitor 301 that configures a resonant circuit RC with the coil 41. The resonant circuit RC has a function of a receiving part that carries out electromagnetic induction coupling with a position detecting sensor 220 (see FIG. 4) of a position detecting device 200 to be described later and receives an electromagnetic wave signal sent from the position detecting sensor 220 and a function of transmitting the received electromagnetic wave signal to the position detecting sensor 220 in a feedback manner.

In this embodiment, a series circuit of a capacitor 302 and a variable-capacitance capacitor 51C formed of the writing pressure detecting circuit 51 is connected in parallel to the capacitor 301 configuring the resonant circuit RC. The resonant frequency of the resonant circuit RC changes through change in the capacitance of the variable-capacitance capacitor 51C formed of the writing pressure detecting circuit 51 according to the pressure (writing pressure) applied to the core body 30.

In this embodiment, a switch circuit 303 that causes short-circuiting between both ends of the variable-capacitance capacitor 51C is connected. The switch circuit 303 is formed of a semiconductor switch such as an FET (Field-Effect Transistor), for example. The switch circuit 303 is on/off-controlled by a switch control signal sent from the electronic circuit (second electronic circuit) 100 through the terminal part 34a of the connector plug 3P and is an example of the controlled part. When the switch circuit 303 is turned on, the variable-capacitance capacitor 51C is bypassed and the involvement of the variable-capacitance capacitor 51C in the resonant circuit RC becomes ineffective. Therefore, the writing pressure applied to the core body 30 becomes equivalent to zero. That is, by turning on the switch circuit 303, the resonant frequency of the resonant circuit RC can be set to the frequency when the writing pressure is zero, so that writing pressure zero adjustment can be carried out.

Moreover, in this embodiment, a switch circuit 304 is connected in parallel to the coil 41. The switch circuit 304 is formed of a semiconductor switch such as an FET, for example. The switch circuit 304 is on/off-controlled by a switch control signal sent from the electronic circuit (second electronic circuit) 100 through the terminal part 33a of the connector plug 3P and is an example of the controlled part. When the switch circuit 304 is turned on, both ends of the coil 41 are short-circuited and therefore the resonant circuit RC becomes the state of stopping resonant operation (non-operating state). Furthermore, when the switch circuit 304 is in the off-state, the resonant circuit RC becomes the operating state.

The configuration is made in such a manner that a supply voltage Vcc of the switch circuits 303 and 304 is sent from the electronic circuit (second electronic circuit) 100 through the terminal part 32a of the connector plug 3P.

One end of the coil 41 is connected to an earth conductor of the printed circuit board 52 and is connected to the terminal part 35a of the connector plug 3P. Furthermore, to the other end side of the coil 41, a reception level generating circuit 305 that generates information indicating the signal level of an electromagnetic induction signal from the position detecting sensor received by the resonant circuit RC having the function as the receiving part is connected.

The reception level generating circuit 305 is composed of a capacitor 306 that removes a direct-current signal of the electromagnetic induction signal from the position detecting sensor received by the resonant circuit RC, diodes 307 and 308 that configure a rectifying circuit for rectifying an alternating-current signal through the capacitor 306 and generating an output signal corresponding to the signal level of the received signal, and a capacitor 309. The signal level of the output signal of the reception level generating circuit 305 is according to the strength of electromagnetic coupling between the resonant circuit RC of the electronic pen 1 and the position detecting sensor.

When the signal level of the output signal of the reception level generating circuit 305 is higher than a predetermined threshold level, the state is made in which the electronic pen 1 and the position detecting sensor are electromagnetically coupled at such a degree that the position indicated by the electronic pen 1 can be detected by the position detecting sensor. Furthermore, when the signal level is equal to or lower than the above-described threshold, the electronic pen 1 and the position detecting sensor are in the state of being not electromagnetically coupled at such a degree that the position indicated by the electronic pen 1 can be detected by the position detecting sensor.

In the following description of this specification, a state in which the electronic pen 1 is electromagnetically coupled with the position detecting sensor at such a degree that the position indicated by the electronic pen 1 can be detected by the position detecting sensor will be referred to as in-range. Furthermore, a state in which the in-range state is not made will be referred to as out-of-range. The output signal of the reception level generating circuit 305 is supplied to the electronic circuit (second electronic circuit) 100 through the terminal part 31a of the connector plug 3P.

In the electronic circuit 100, a control circuit 101 formed of an IC is disposed. The control circuit 101 is formed of a microcomputer (microprocessor). Each of the five contact terminals 13J1, 13J2, 13J3, 13J4, and 13J5 of the connector jack 13J is connected to the control circuit 101.

Furthermore, to the control circuit 101, a wireless communication circuit 102, an ID memory 103, a pen state detecting circuit 104, an LED (Light Emitting Diode) drive circuit 105, and the battery 15 are connected.

The wireless communication circuit 102 is what carries out wireless communication with a wireless communication circuit 210 (see FIG. 4) disposed in the position detecting device 200 including the position detecting sensor 220 and is formed of a wireless communication module of the Bluetooth (registered trademark) standard in this example. The control circuit 101 sets the wireless communication circuit 102 to the non-operating state when having not detected the in-range state in which the electronic pen 1 is electromagnetically coupled with the position detecting sensor 220 of the position detecting device 200. When having detected the in-range state, the control circuit 101 sets the wireless communication circuit 102 to the operating state and carries out control to generate a wireless communication path with the wireless communication circuit 210 of the position detecting device 200.

Identification information (hereinafter, referred to as pen ID (Identification)) to identify the electronic pen 1 is stored in the ID memory 103. This pen ID is unique information given to each electronic pen and is stored at the time of manufacturing, for example, for each electronic pen. When the wireless communication path has been generated with the position detecting device 200, the control circuit 101 transmits the pen ID stored in the ID memory 103 to the position detecting device 200 through the wireless communication circuit 102.

The pen state detecting circuit 104 is what detects the pen posture regarding the tilt, rotation, movement speed, pen swing, and so forth of the electronic pen 1, the state of a hand of a user that grips the electronic pen 1, and so forth as information on the pen state, and includes a nine-axis sensor for detecting the pen posture and a temperature-humidity sensor. Instead of the nine-axis sensor, a three-axis sensor or six-axis sensor may be employed. When the wireless communication path has been generated with the position detecting device 200, the control circuit 101 transmits the information on the pen state detected by the pen state detecting circuit 104 to the position detecting device 200 through the wireless communication circuit 102.

The LED drive circuit 105 is a circuit that drives an LED 16. The LED 16 is what configures an example of informing means that informs coupling between the electronic pen 1 and the position detecting sensor based on control by the control circuit 101 when the electronic pen 1 is coupled with the position detecting sensor as described later. As depicted by a circle mark in FIGS. 1A and 1B, the LED 16 is attached in such a manner that informing by lighting thereof is transmitted from the pen casing 2 to the external. As the informing means, informing by sound may be carried out instead of the informing by light as in this example or in addition to the informing by light.

The battery 15 may be a fixed battery (primary battery). However, in this example, a rechargeable battery (secondary battery) is used. Although diagrammatic representation is omitted, in this example, an electrode for charging is formed at the end part 12a of the knock bar 12 of the electronic pen 1.

Circuit Configuration Example of Position Detecting Device

Figure 4:
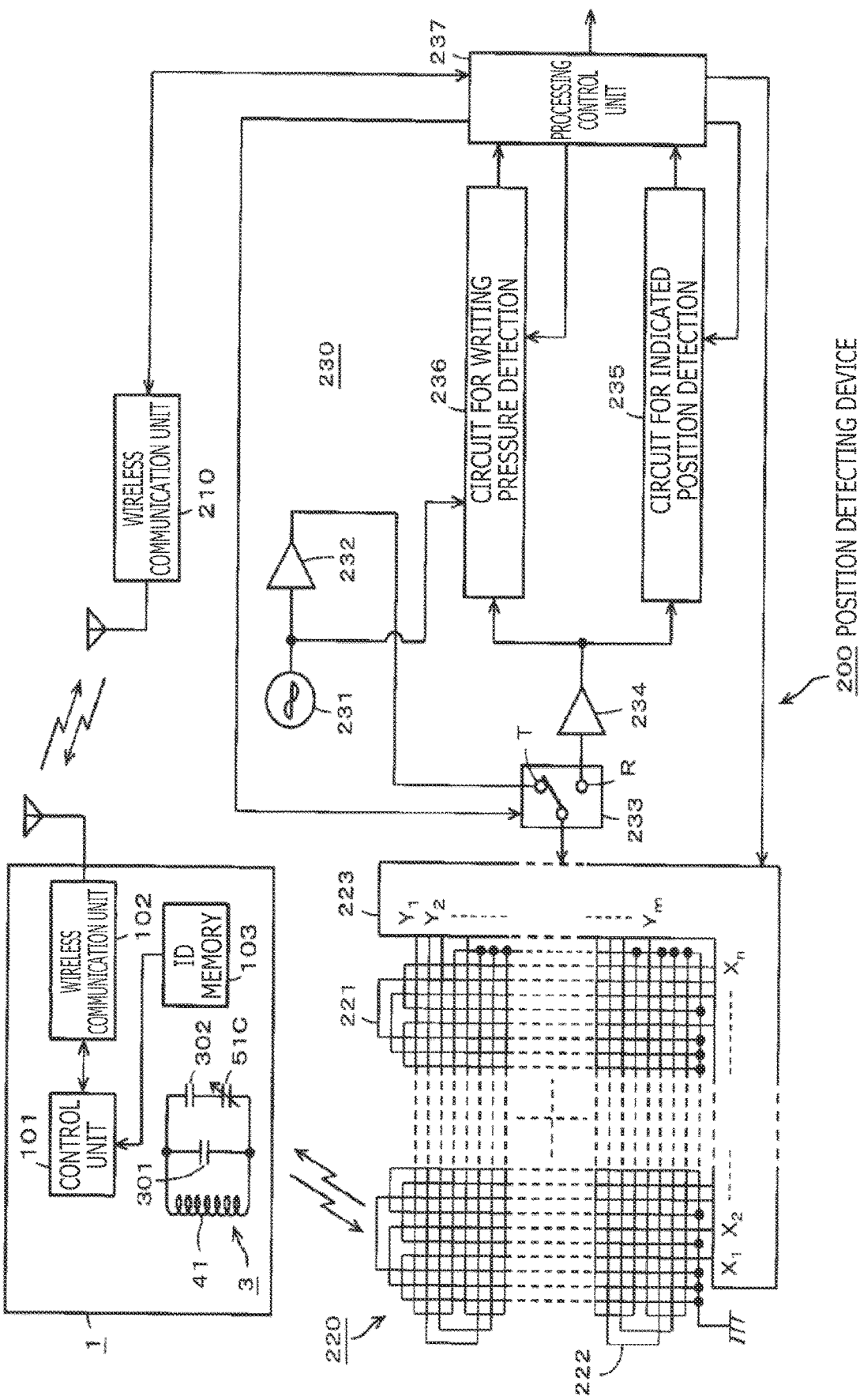
FIG. 4 is a diagram for explaining a circuit configuration example of a position detecting device used with an electronic pen according to an embodiment of this disclosure.

FIG. 4 is a diagram depicting an electronic circuit configuration of the position detecting device 200 used with the electronic pen 1 of this embodiment.

The position detecting device 200 of the electromagnetic induction system in this embodiment includes the wireless communication circuit 210, the position detecting sensor 220, and a transmission-reception processing circuit 230.

The wireless communication circuit 210 is what is for wireless communication with the wireless communication circuit 102 of the electronic pen 1 and is formed of a wireless communication module of the Bluetooth (registered trademark) standard in this example.

The position detecting sensor 220 is formed of a position detecting coil in which an X-axis direction loop coil group 221 and a Y-axis direction loop coil group 222 are stacked. The position detecting device 200 transmits a signal to the resonant circuit RC of the electronic pen 1 through the position detecting sensor 220 by electromagnetic coupling and the electronic pen 1 feeds back the signal received from the position detecting device 200 to the position detecting sensor 220 through the resonant circuit RC.

Then, the position detecting device 200 receives the feedback signal from the resonant circuit RC of the electronic pen 1 by electromagnetic coupling and detects the position on the position detecting sensor 220 indicated by the electronic pen 1 from the position on the position detecting sensor 220 at which the received signal is detected. In addition, the position detecting device 200 detects change in the resonant frequency by detecting phase change of the signal received from the resonant circuit RC of the electronic pen 1 by the electromagnetic coupling, and detects the writing pressure applied to the core body 30 of the electronic pen 1.

In the transmission-reception processing circuit 230, a selection circuit 223 to which the X-axis direction loop coil group 221 and the Y-axis direction loop coil group 222 of the position detecting sensor 220 are connected is disposed. The selection circuit 223 sequentially selects one loop coil in the two loop coil groups 221 and 222.

Furthermore, in the transmission-reception processing circuit 230, an oscillator 231, a current driver 232, a switching connecting circuit 233, a receiving amplifier 234, a circuit 235 for indicated position detection, a circuit 236 for writing pressure detection, and a processing control circuit 237 are disposed. The processing control circuit 237 is formed of a microcomputer. The processing control circuit 237 controls selection of the loop coil in the selection circuit 223 and switching of the switching connecting circuit 233, and controls processing timings in the circuit 235 for indicated position detection and the circuit 236 for writing pressure detection. Furthermore, the processing control circuit 237 is connected to the wireless communication circuit 210 and controls transmission and reception of wireless signals with the electronic pen 1 through the wireless communication circuit 210.

The oscillator 231 generates an alternating-current signal with a frequency f0. Then, the oscillator 231 supplies the generated alternating-current signal to the current driver 232 and the circuit 236 for writing pressure detection. The current driver 232 converts the alternating-current signal supplied from the oscillator 231 to a current and sends out the current to the switching connecting circuit 233. Based on control from the processing control circuit 237, the switching connecting circuit 233 switches the connection target (transmitting-side terminal T, receiving-side terminal R) to which the loop coil selected by the selection circuit 223 is connected. In these connection targets, the transmitting-side terminal T and the receiving-side terminal R are connected to the current driver 232 and the receiving amplifier 234, respectively.

An induced voltage generated in the loop coil selected by the selection circuit 223 is sent to the receiving amplifier 234 via the selection circuit 223 and the switching connecting circuit 233. The receiving amplifier 234 amplifies the induced voltage supplied from the loop coil and sends out the amplified voltage to the circuit 235 for indicated position detection and the circuit 236 for writing pressure detection.

In each loop coil of the X-axis direction loop coil group 221 and the Y-axis direction loop coil group 222, an induced voltage is generated by radio waves transmitted from the electronic pen 1. The circuit 235 for indicated position detection detects the induced voltage generated in the loop coil, i.e., the received signal, and converts the detected output signal to a digital signal to output the digital signal to the processing control circuit 237. The processing control circuit 237 calculates the coordinate value of the position indicated by the electronic pen 1 in the X-axis direction and the Y-axis direction based on the digital signal from the circuit 235 for indicated position detection, i.e., the level of the voltage value of the induced voltage generated in each loop coil.

Meanwhile, the circuit 236 for writing pressure detection carries out synchronous detection of the output signal of the receiving amplifier 234 with the alternating-current signal from the oscillator 231 and obtains a signal with a level according to the phase difference (frequency shift) between them to convert the signal according to the phase difference (frequency shift) to a digital signal and output the digital signal to the processing control circuit 237. The processing control circuit 237 detects the writing pressure applied to the electronic pen 1 based on the digital signal from the circuit 236 for writing pressure detection, i.e., the level of the signal according to the phase difference (frequency shift) between the transmitted radio waves and the received radio waves.

In this example, the processing control circuit 237 is connected to the wireless communication circuit 210 and manages and controls wireless communication in the wireless communication circuit 210. In addition, the processing control circuit 237 carries out wireless communication with the electronic pen 1 through the wireless communication circuit 210. Furthermore, the processing control circuit 237 detects and manages the electronic pen 1 electromagnetically coupled with the position detecting sensor 220 by information received through the wireless communication circuit 210. In addition, the processing control circuit 237 controls control elements (in this example, switch circuits 303 and 304) disposed in the electronic pen 1 by sending control signals to the electronic pen 1 through the wireless communication circuit 210.

Operation of Electronic Pen 1 and Operation of Position Detecting Device 200

Operation of Electronic Pen 1

Figure 5:
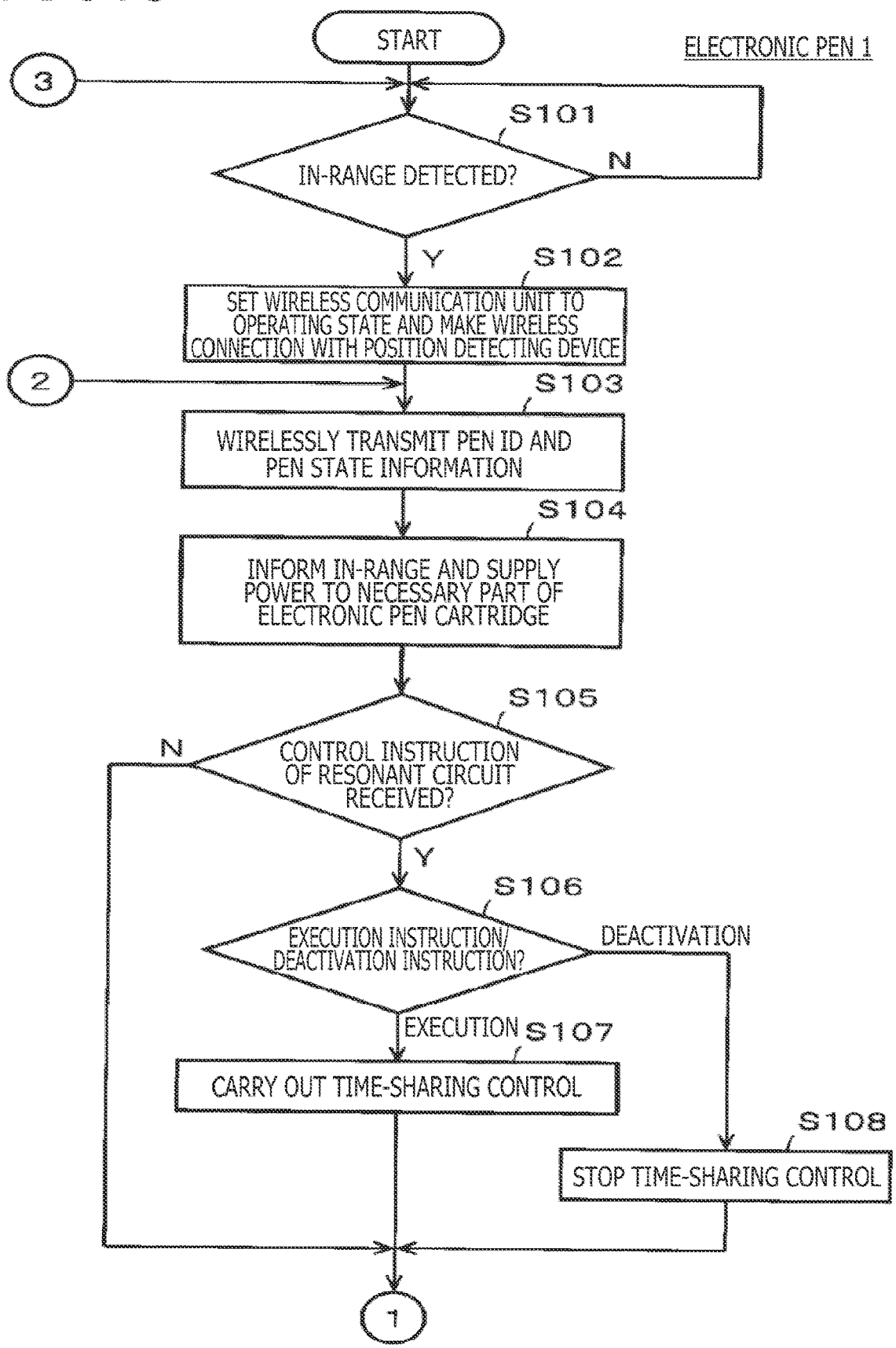
FIG. 5 is a diagram depicting part of a flowchart for explaining an operation example of an electronic pen according to an embodiment of this disclosure.
Figure 6:
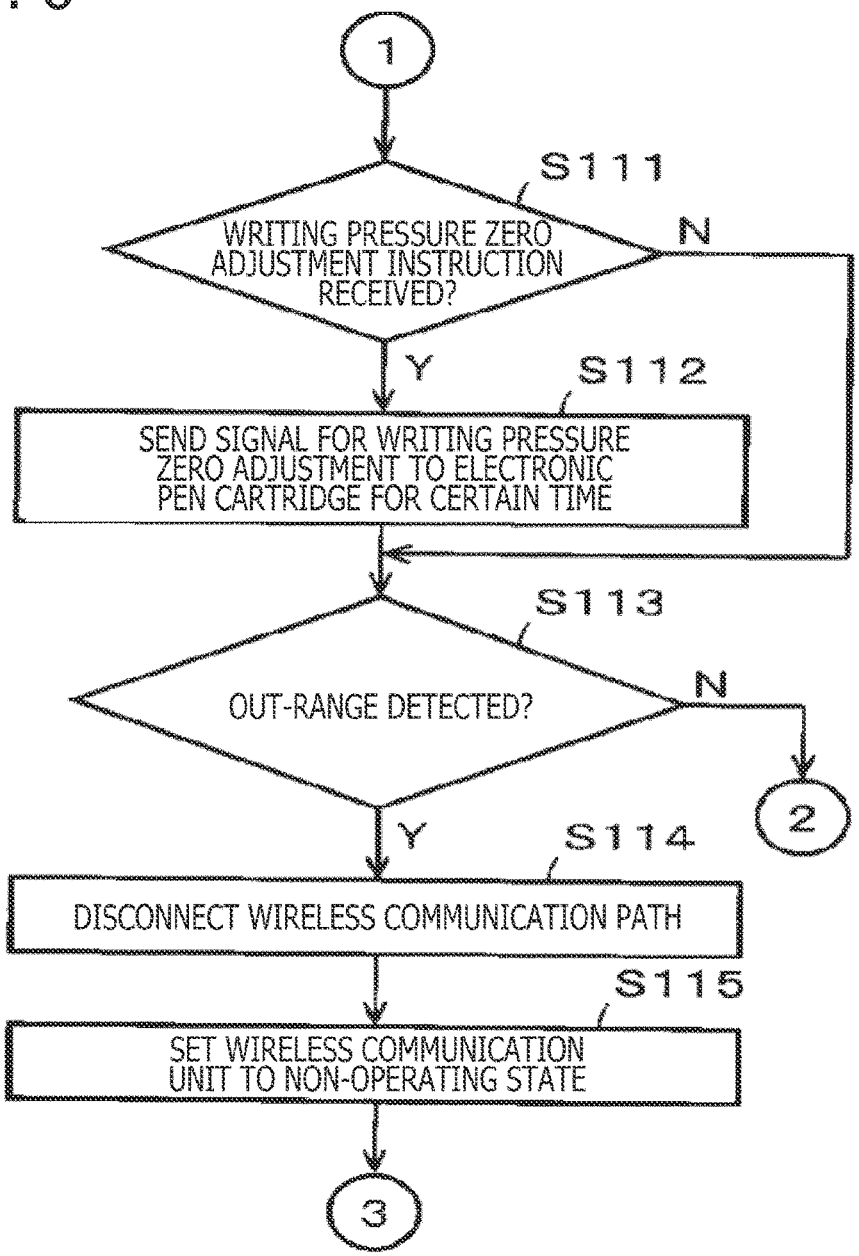
FIG. 6 is a diagram depicting part of the flowchart for explaining the operation example of the embodiment of the electronic pen according to this disclosure.

FIG. 5 and FIG. 6 are a flowchart for explaining an example of the flow of operation of the control circuit 101 of the electronic pen 1. By using this flowchart of FIG. 5 and FIG. 6, operation of the electronic pen 1 with the above-described configuration will be described below.

The control circuit 101 of the electronic pen 1 monitors the signal level of the output signal of the reception level generating circuit 305 of the electronic pen cartridge 3 received through the contact terminal 13J1 of the connector jack 13J, and determines whether or not the electronic pen 1 is electromagnetically coupled with the position detecting sensor 220 of the position detecting device 200 and has entered the in-range state based on whether or not this signal level has exceeded a predetermined threshold level (S101).

When determining that the in-range state has not been detected at S101, the control circuit 101 returns the processing to S101 and repeats the processing of S101 and the subsequent processing. Furthermore, when determining that the in-range state has been detected at S101, the control circuit 101 sets the wireless communication circuit 102 to the operating state and carries out control to generate a wireless communication path with the wireless communication circuit 210 of the position detecting device 200 and make a wireless connection (S102).

Next, the control circuit 101 reads out the pen ID from the ID memory 103 and acquires information on the pen state (information on the tilt, rotation, temperature and humidity, and so forth of the electronic pen 1) from the pen state detecting circuit 104 to transmit them to the position detecting device 200 through the wireless communication path generated between the wireless communication circuit 102 and the position detecting device 200 (S103). At this time, a notification indicating that the electronic pen 1 has entered the in-range state is not included in the information wirelessly transmitted from the electronic pen 1 to the position detecting device 200. However, this notification may be wirelessly transmitted to the position detecting device 200, obviously. The wireless transmission at S103 is carried out continuously at a predetermined cycle, for example, through the wireless communication circuit 102 while the in-range state continues.

Furthermore, the control circuit 101 informs the user that the electronic pen 1 has entered the in-range state by lighting the LED through the LED drive circuit 105. Then, the control circuit 101 provides a supply voltage to the switch circuits 303 and 304 of the electronic pen cartridge 3 through the contact terminal 13J2 of the connector jack 13J and the terminal part 32a of the connector plug 3P (S104).

Next, the control circuit 101 determines whether or not a control instruction of the resonant circuit RC has been received from the position detecting device 200 through the wireless communication circuit 102 (S105). This control instruction of the resonant circuit RC sent from the position detecting device 200 is what is for implementing a multi-pen function with which position indication by two electronic pens 1 can be simultaneously accepted in the position detecting sensor 220 of the position detecting device 200.

Figure 7:
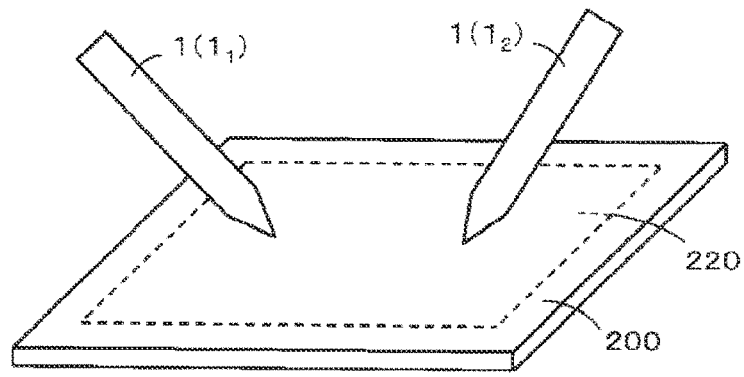
FIG. 7 is a diagram for explaining the operation example of the embodiment of the electronic pen according to this disclosure.

Specifically, as depicted in FIG. 7, even when two electronic pens 1 (in FIG. 7, discriminated as electronic pen $1_1$ and electronic pen $1_2$ for convenience) that are electromagnetically coupled with the position detecting sensor 220 of the position detecting device 200 and have entered the in-range state exist, each of these electronic pen $1_1$ and electronic pen $1_2$ can be identified in the position detecting device 200 because the electronic pen $1_1$ and the electronic pen 12 each wirelessly send out the unique pen ID to the position detecting device 200.

However, in this embodiment, the resonant frequency of the resonant circuit RC is set to a frequency equal between the electronic pen $1_1$ and the electronic pen $1_2$ and therefore it is impossible to discriminate the indicated positions of both in the position detecting device 200 if nothing is done. On the other hand, in the electronic circuit 100 of the electronic pen 1 of this embodiment, the switch circuit 304 that can control the operating state and the non-operating state of the resonant circuit RC is disposed.

Thus, the position detecting device 200 of this embodiment carries out control to operate the resonant circuits RC of the electronic pen $1_1$ and the electronic pen $1_2$ in a time-sharing manner by utilizing the fact that the operation and non-operation of the resonant circuit RC can be controlled through controlling the switch circuit 304 of the electronic pen 1. Thereby, the multi-pen function is implemented. Specifically, the position detecting device 200 sets one of the resonant circuits RC of the two electronic pens $1_1$ and $1_2$ in the in-range state to the operating state and sets the other to the non-operating state every predetermined unit period. In addition, the position detecting device 200 carries out control to alternately switch the electronic pen in which the resonant circuit RC is set to the operating state. The position detecting device 200 recognizes which of the electronic pen $1_1$ and the electronic pen $1_2$ the electronic pen in which the resonant circuit RC is controlled to the non-operating state is from the pen ID thereof, and therefore can recognize and detect, with discrimination, the indicated positions in the position detecting sensor 220 by the electronic pen $1_1$ and the electronic pen $1_2$.

The control instruction of the resonant circuit RC from the position detecting device 200, about which reception is monitored at S105, includes an execution instruction to cause execution of time-sharing operation of the resonant circuits RC of the electronic pens 1 and a deactivation instruction to end the time-sharing operation in execution. In the execution instruction, in each predetermined circuit time of the time sharing, an operation instruction signal to set the resonant circuit RC to the operating state is included for one of the electronic pen $1_1$ and the electronic pen $1_2$ and a non-operation instruction signal to set the resonant circuit RC to the non-operating state is included for the other.

When determining that the control instruction of the resonant circuit RC from the position detecting device 200 has been received at S105, the control circuit 101 determines which of the execution instruction and the deactivation instruction the received control instruction of the resonant circuit RC is (S106).

When determining that the received control instruction of the resonant circuit RC is the execution instruction at S106, the control circuit 101 generates a switching control signal SW1 according to the operation instruction signal or the non-operation instruction signal included in the execution instruction. Then, the control circuit 101 supplies the generated switching control signal SW1 to the switch circuit 304 of the electronic pen cartridge 3 through the contact terminal 13J3 of the connector jack 13J and the terminal part 33a of the connector plug 3P and carries out time-sharing control of the resonant circuit RC (S107).

At S107, when the non-operation instruction signal is included in the execution instruction from the position detecting device 200, the control circuit 101 carries out control to turn on the switch circuit 304 by the switching control signal SW1. Thereby, both ends of the coil 41 of the resonant circuit RC of the electronic pen cartridge 3 are short-circuited through the switch circuit 304 and therefore the resonant circuit RC becomes the non-operating state.

Furthermore, when the operation instruction signal is included in the execution instruction from the position detecting device 200, the control circuit 101 carries out control to turn off the switch circuit 304 by the switching control signal SW1. Thus, the switch circuit 304 becomes the off-state and the resonant circuit RC of the electronic pen cartridge 3 becomes the operating state.

When determining that the received control instruction of the resonant circuit RC is the deactivation instruction at S106, the control circuit 101 supplies the switching control signal SW1 generated based on this deactivation instruction to the switch circuit 304 of the electronic pen cartridge 3 through the contact terminal 13J3 of the connector jack 13J and the terminal part 33a of the connector plug 3P to carry out control to keep the off-state of the switch circuit 304 and stop the time-sharing control on the resonant circuit RC (S108).

Furthermore, when the control circuit 101 determines that the control instruction of the resonant circuit RC from the position detecting device 200 has not been received at S105 or subsequently to S107 or S108, the control circuit 101 determines whether or not a writing pressure zero adjustment instruction has been received from the position detecting device 200 through the wireless communication circuit 102 (S111 in FIG. 6).

When determining that the writing pressure zero adjustment instruction has been received at S111, the control circuit 101 generates a switching control signal SW2 to set the switch circuit 303 to the on-state for a predetermined time as a signal for writing pressure zero adjustment and supplies the switching control signal SW2 to the switch circuit 303 of the electronic pen cartridge 3 through the contact terminal 13J4 of the connector jack 13J and the terminal part 34a of the connector plug 3P (S112).

When the switch circuit 303 is turned on at S112, both ends of the variable-capacitance capacitor 51C formed of the writing pressure detecting circuit 51 are short-circuited. Therefore, the resonant frequency of the resonant circuit RC becomes the frequency when the variable-capacitance capacitor 51C does not exist, i.e., the resonant frequency when the writing pressure is zero.

In the position detecting device 200, it is understood that, in the electronic pen 1 to which the writing pressure zero adjustment instruction has been transmitted, the resonant frequency of the resonant circuit RC becomes the resonant frequency when the writing pressure is zero based on it for a predetermined time. Thus, the processing control circuit 237 of the position detecting device 200 can detect the resonant frequency when the writing pressure is zero regarding the electronic pen 1 from the output of the circuit 236 for writing pressure detection during this predetermined time. Therefore, in the processing control circuit 237 of the position detecting device 200, it becomes possible to accurately detect the amount of variation in the resonant frequency due to the writing pressure and the detection is allowed even when the writing pressure applied to the electronic pen 1 is low. In addition, widening of the dynamic range of the writing pressure that can be detected can be implemented.

Subsequent to S112 or when the control circuit 101 determines that the writing pressure zero adjustment instruction has not been received at S111, the control circuit 101 determines whether or not the electronic pen 1 has entered the out-of-range state in which the electronic pen 1 is not electromagnetically coupled with the position detecting sensor 220 of the position detecting device 200 (S113). This detection of whether the electronic pen 1 has entered the out-of-range state is carried out through monitoring, by the control circuit 101, of the signal level of the output signal of the reception level generating circuit 305 of the electronic pen cartridge 3 received through the contact terminal 13J1 of the connector jack 13J and based on whether or not this signal level has become equal to or lower than a predetermined threshold level.

However, in this embodiment, the control circuit 101 determines that the electronic pen 1 has entered the out-of-range state when the state in which the signal level of the output signal of the reception level generating circuit 305 of the electronic pen cartridge 3 is equal to or lower than the predetermined threshold level has continued for a predetermined time. This is because there are many cases in which, even when the user separates the electronic pen 1 in use from the state of being electromagnetically coupled with the position detecting sensor 220 for a short time, the user sets the electronic pen 1 to the in-range state again immediately after the separation and continues the use.

When determining that the electronic pen 1 has not entered the out-of-range state at S113, the control circuit 101 returns the processing to S103 and repeats the processing of S103 and the subsequent processing.

Furthermore, when determining that the electronic pen 1 has entered the out-of-range state at S113, the control circuit 101 controls the wireless communication circuit 102 to disconnect the wireless communication path with the position detecting device 200 and stop the transmission of the pen ID and the information on the pen state to the position detecting device 200. In addition, the control circuit 101 controls the LED drive circuit 105 to extinguish the lit LED 16 and inform that the electronic pen 1 has entered the our-range state from the in-range state (S114). Then, the control circuit 101 controls the wireless communication circuit 102 to the non-operating state (S115). Thereafter, the control circuit 101 returns the processing to S101 in FIG. 5 and repeats the processing of S101 and the subsequent acts.

Operation of Position Detecting Device 200

Figure 8:
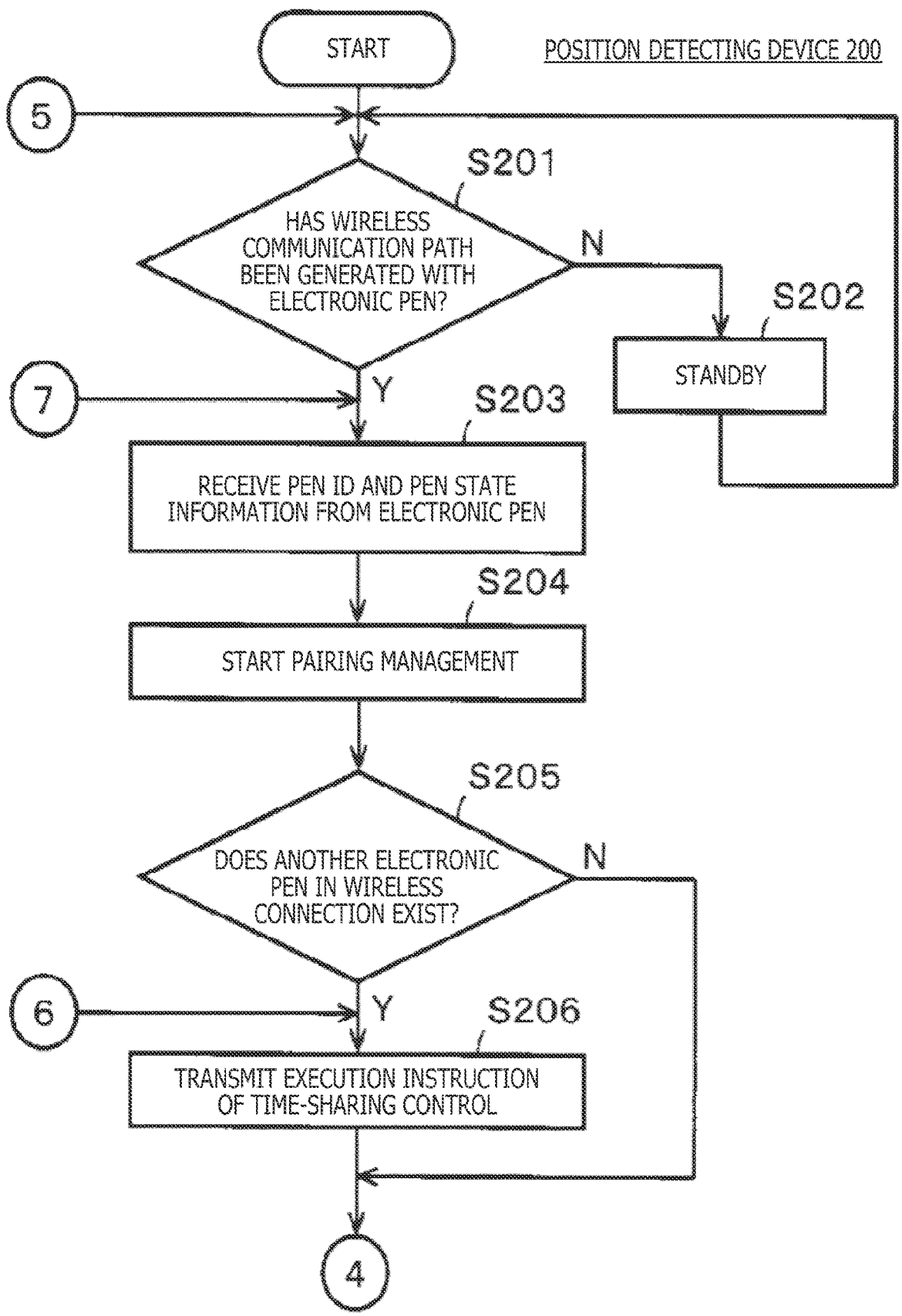
FIG. 8 is a diagram depicting part of a flowchart for explaining an operation example of the position detecting device used with the embodiment of the electronic pen according to this disclosure.
Figure 9:
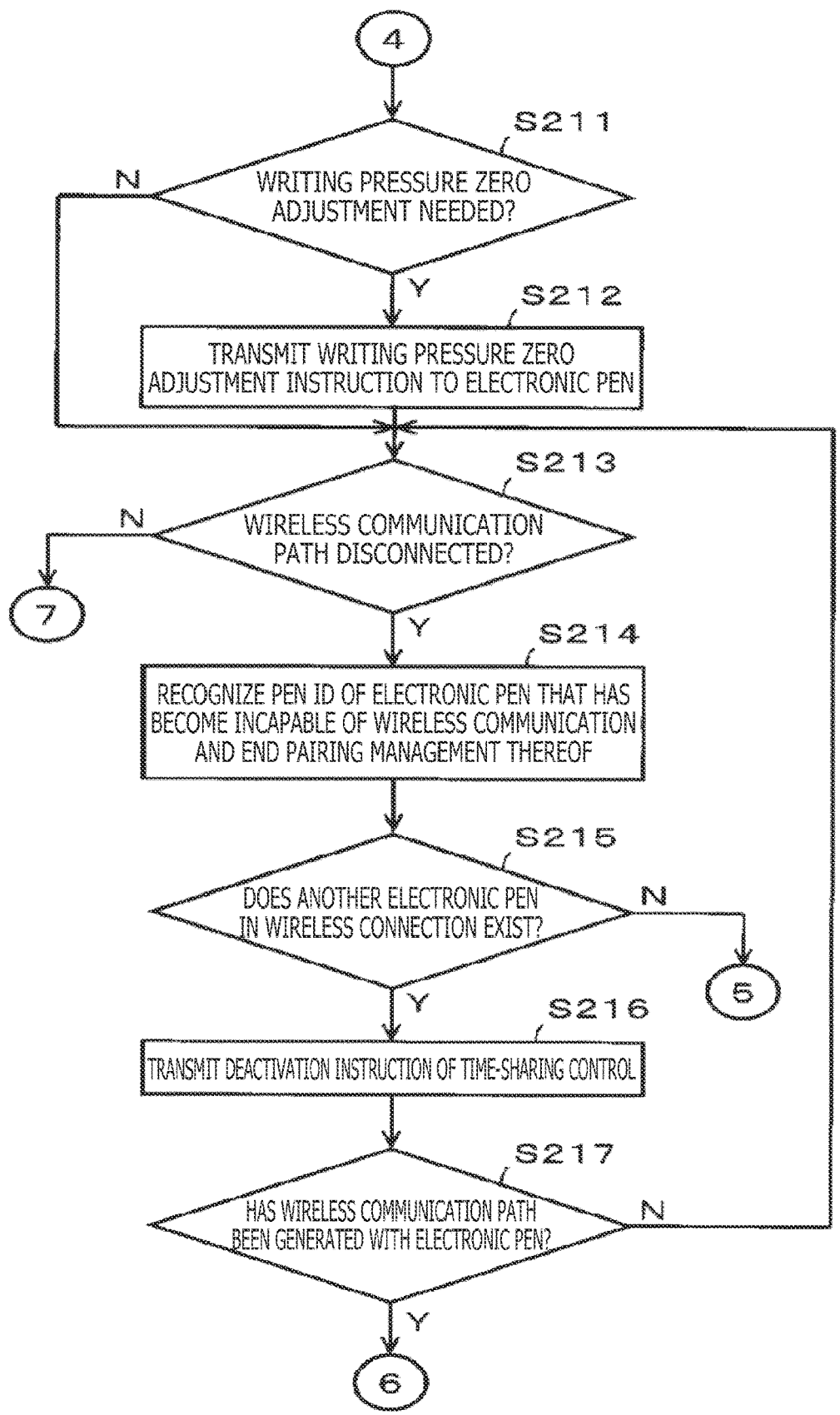
FIG. 9 is a diagram depicting part of the flowchart for explaining the operation example of the position detecting device used with the embodiment of the electronic pen according to this disclosure.

FIG. 8 and FIG. 9 are a flowchart for explaining an example of the flow of operation of the processing control circuit 237 of the position detecting device 200. By using this flowchart of FIG. 8 and FIG. 9, operation of the position detecting device 200 with the above-described configuration will be described below.

The processing control circuit 237 monitors a notification of the monitoring result of the wireless communication state from the wireless communication circuit 210 and determines whether or not a wireless communication path between the wireless communication circuit 210 and the wireless communication circuit 102 of the electronic pen 1 has been generated (S201 in FIG. 8). When determining that a wireless communication path has not been generated at S201, the processing control circuit 237 keeps the standby state (S202) and returns the processing to S201.

When determining that a wireless communication path between the wireless communication circuit 210 and the wireless communication circuit 102 of the electronic pen 1 has been generated at S201, the processing control circuit 237 receives the pen ID and information on the pen state sent from the electronic pen 1 (S203). Then, the processing control circuit 237 recognizes the electronic pen 1 that is electromagnetically coupled with the position detecting sensor 220 and has entered the in-range state based on the received pen ID. In addition, the processing control circuit 237 starts pairing management to manage the management state of the electronic pen 1 in the in-range state based on management table information, for example (S204). As the management table information, for example, information on the electromagnetic coupling state depicting whether the electronic pen 1 is in the in-range state or in the out-of-range state, the state of whether or not the time-sharing control is in execution, the state of the resonant circuit in the time-sharing control when the time-sharing control is in execution, the history (including clock time) of the writing pressure zero adjustment instruction, and so forth are associated with the pen ID and held in a storing circuit device (diagrammatic representation is omitted) incorporated in the processing control circuit 237.

Next, the processing control circuit 237 refers to the management table information of pairing and determines whether or not another electronic pen 1 that has entered the in-range state antecedently exists (S205).

When determining that another electronic pen 1 that has entered the in-range state exists at S205, the processing control circuit 237 transmits the above-described execution instruction of the time-sharing control through the wireless communication circuit 210 (S206). At S206, the processing control circuit 237 transmits the execution instruction of the time-sharing control also to the other electronic pen 1 that has entered the in-range state. Specifically, the processing control circuit 237 sends, to one of the two electronic pens 1 that have entered the in-range state, a control signal to set its resonant circuit RC to the operating state as a time-sharing control signal and sends, to the other, a control signal to set the resonant circuit RC to the non-operating state as the time-sharing control signal.

This allows the processing control circuit 237 of the position detecting device 200 to implement what is generally called the multi-pen function with which position indication by two electronic pens 1 in the in-range state is detected through one position detecting sensor 220. Furthermore, the processing control circuit 237 executes also processing of associating information on the pen state, information on the temperature and humidity, and so forth sent with the pen ID through the wireless communication circuit 210 with the position indicated by each of the electronic pens 1 detected by using the position detecting sensor 220 and outputting them.

Moreover, when determining that another electronic pen 1 that has entered the in-range state does not exist at S205 or subsequent to S206, the processing control circuit 237 determines whether or not the electronic pen in which the timing at which writing pressure zero adjustment should be carried out has come exists with reference to the management table information of pairing, for example (S211 in FIG. 9).

When determining that the electronic pen in which the timing at which writing pressure zero adjustment should be carried out has come exists at S211, the processing control circuit 237 transmits the writing pressure zero adjustment instruction to the electronic pen 1 about which it is determined that the timing at which writing pressure zero adjustment should be carried out has come through the wireless communication circuit 210 (S212).

If the electronic pen in which the timing at which writing pressure zero adjustment should be carried out has come does not exist at S211 or subsequent to S212, the processing control circuit 237 determines whether or not the electronic pen 1 whose wireless communication path has been disconnected exists in the electronic pens 1 for which the pairing management is being carried out (S213). When determining that the electronic pen 1 whose wireless communication path has been disconnected does not exist at S213, the processing control circuit 237 returns the processing to S203 in FIG. 8 and repeats the processing of S203 and the subsequent processing.

When determining that the electronic pen 1 whose wireless communication path has been disconnected exists at S213, the processing control circuit 237 recognizes the pen ID of the electronic pen 1 whose wireless communication path has been disconnected and deletes record of the management table of pairing of the electronic pen 1 to end the pairing management of the electronic pen (S214). Then, the processing control circuit 237 refers to the management table information of pairing and determines whether or not another electronic pen 1 that is still in the wireless connection exists (S215).

When determining that another electronic pen 1 in the wireless connection does not exist at S215, the processing control circuit 237 returns the processing to S201 and repeats the processing of S201 and the subsequent processing.

Furthermore, when determining that another electronic pen 1 that is still in the wireless connection exists at S215, the processing control circuit 237 transmits the deactivation instruction to stop the time-sharing control carried out thus far to the relevant electronic pen 1 that has entered the out-of-range state and the electronic pen 1 that keeps the in-range state (S216).

Next, the processing control circuit 237 determines whether or not a wireless communication path has been newly generated with the electronic pen (S217). When determining that a wireless communication path has not been newly generated with the electronic pen at S217, the processing control circuit 237 returns the processing to S213 and repeats the processing of S213 and the subsequent processing.

Furthermore, when determining that a wireless communication path has been newly generated with the electronic pen at S217, the processing control circuit 237 makes a transition of the processing to S206 in FIG. 9 and repeats the processing of S206 and the subsequent processing.

Effects of Electronic Pen Cartridge 3 and Electronic Pen 1 of Embodiment

The connector plug 3P of the electronic pen cartridge 3 with the above-described configuration includes the terminal parts 31a, 32a, 33a, 34a, and 35a in which the circular annular conductor contact parts are exposed at different positions in the axis center direction. Furthermore, the circular annular conductor contact parts of the terminal parts 31a, 32a, 33a, 34a, and 35a of the connector plug 3P get contact with the contact terminals 13J1, 13J2, 13J3, 13J4, and 13J5 of the connector jack 13J disposed on the rear end side of the hollow part of the pen casing 2 and thereby an electrical connection is made. Due to this, even when rotational torque is applied to the electronic pen cartridge 3 at the time of use of the electronic pen 1, the electrical connection between the terminal parts of the connector plug 3P and the contact terminals of the connector jack 13J is always kept and electrical non-contact can be avoided.

Therefore, all functions of the electronic pen 1 do not need to be set in the electronic pen cartridge 3. Even when an electronic circuit including the necessary electrical functional components is disposed in the hollow part of the pen casing 2 of the electronic pen 1, the electronic pen cartridge 3 and the external electronic circuit can be electrically connected surely.

For this reason, it suffices that only the minimum necessary circuit components for implementing the position indication function with respect to the position detecting device 200 be housed in the electronic pen cartridge 3. Furthermore, the battery that provides a supply voltage can also be disposed outside the electronic pen cartridge 3. As described above, according to the above-described embodiment, reduction in the thickness of the electronic pen cartridge 3 can be ensured while the electrical connection state between the electronic pen cartridge 3 and the external is kept.

Moreover, the electronic pen 1 of the above-described embodiment includes the wireless communication circuit 102 for wireless communication with the position detecting device 200. In addition, the electronic pen 1 includes the ID memory of the pen ID and can transmit the pen ID to the position detecting device 200. Therefore, position indication information by the electronic pen 1 detected through the position detecting sensor of the position detecting device 200 can be managed in association with the pen ID.

Furthermore, in the electronic pen 1 of the above-described embodiment, the signal level of an electromagnetic induction signal based on the situation in which the resonant circuit RC of the electronic pen cartridge 3 has entered the state of being electromagnetically coupled with the position detecting sensor 220 (in-range state) is detected by the control circuit 101, and the in-range state is notified to the position detecting device 200 through the wireless communication path together with the pen ID. Therefore, in the position detecting device 200, the electronic pen 1 electromagnetically coupled with the position detecting sensor 220 can be recognized by the pen ID received by the wireless communication.

Moreover, the electronic pen cartridge 3 of the electronic pen 1 of the above-described embodiment includes the switch circuit 304 as the control circuit for switching control of the resonant circuit RC to the operating state and the non-operating state and has a configuration that can control the state of the switch circuit 304 by a control signal from the external.

In combination with the feature that the electronic pen cartridge 3 includes the switch circuit 304 and the feature that the position detecting device 200 can recognize the electronic pen 1 in the in-range state by its pen ID, the time-sharing control of the operating state and the non-operating state of the resonant circuit RC of the electronic pen cartridge 3 is carried out in the position detecting device 200 through the wireless communication circuit. Due to this, position indication on the position detecting sensor 220 by two electronic pens 1 can be simultaneously detected and managed.

Furthermore, in the above-described embodiment, by a control instruction from the position detecting device 200, control can be carried out to disable the variable-capacitance capacitor 51C formed of the writing pressure detecting circuit 51 with respect to the resonant circuit RC of the electronic pen cartridge 3. Therefore, writing pressure zero adjustment of the electronic pen 1 can be carried out from the side of the position detecting device 200 at appropriate timing.

Moreover, in the electronic pen 1 of the above-described embodiment, when it is determined that the electronic pen 1 has entered the in-range state in which the electronic pen 1 is electromagnetically coupled with the position detecting sensor 220, the wireless communication circuit 102 is set to the operating state and a wireless communication path is generated with the position detecting device 200. This allows the position detecting device 200 to understand that the electronic pen 1 with which the wireless communication path has been generated is in the in-range state in which the electronic pen 1 is electromagnetically coupled with the position detecting sensor 220. That is, without sending notification information of the in-range state from the electronic pen 1 to the position detecting device 200, it can be understood that the electronic pen 1 is in the in-range state in the position detecting device 200.

A configuration may be employed in which the wireless communication circuit 102 of the electronic pen 1 is set to the state of being capable of always connecting a wireless communication path with the wireless communication circuit 210 of the position detecting device 200 and the electronic pen 1 can make a wireless connection with the position detecting device 200 before entering the in-range state. In this case, when detecting that the electronic pen 1 has entered the in-range state, the electronic pen 1 wirelessly transmits a notification indicating it to the position detecting device 200 through the wireless communication path.

OTHER EMBODIMENTS

First Other Embodiment

In the above-described embodiment, the processing control circuit 237 of the position detecting device 200 carries out also communication control through the wireless communication circuit 210 and pairing management. However, the configuration may be made in such a manner that these control and management are carried out by a control circuit different from the processing control circuit 237, obviously. However, it goes without saying that, also in this case, the different control circuit and the processing control circuit 237 are connected to each other and carry out cooperative operation.

Furthermore, in the electronic pen 1 of the above-described embodiment, the configuration is made in such a manner that switching control of the operating state and the non-operating state of the resonant circuit RC can be carried out in the electronic pen cartridge 3, and the position detecting device 200 implements the multi-pen function by the time-sharing control. However, the configuration may be made in such a manner that the position detecting device 200 implements the multi-pen function by the time-sharing control through carrying out switching control of the resonant frequency of the resonant circuit RC instead of controlling the operation and non-operation of the resonant circuit RC.

Figure 10:
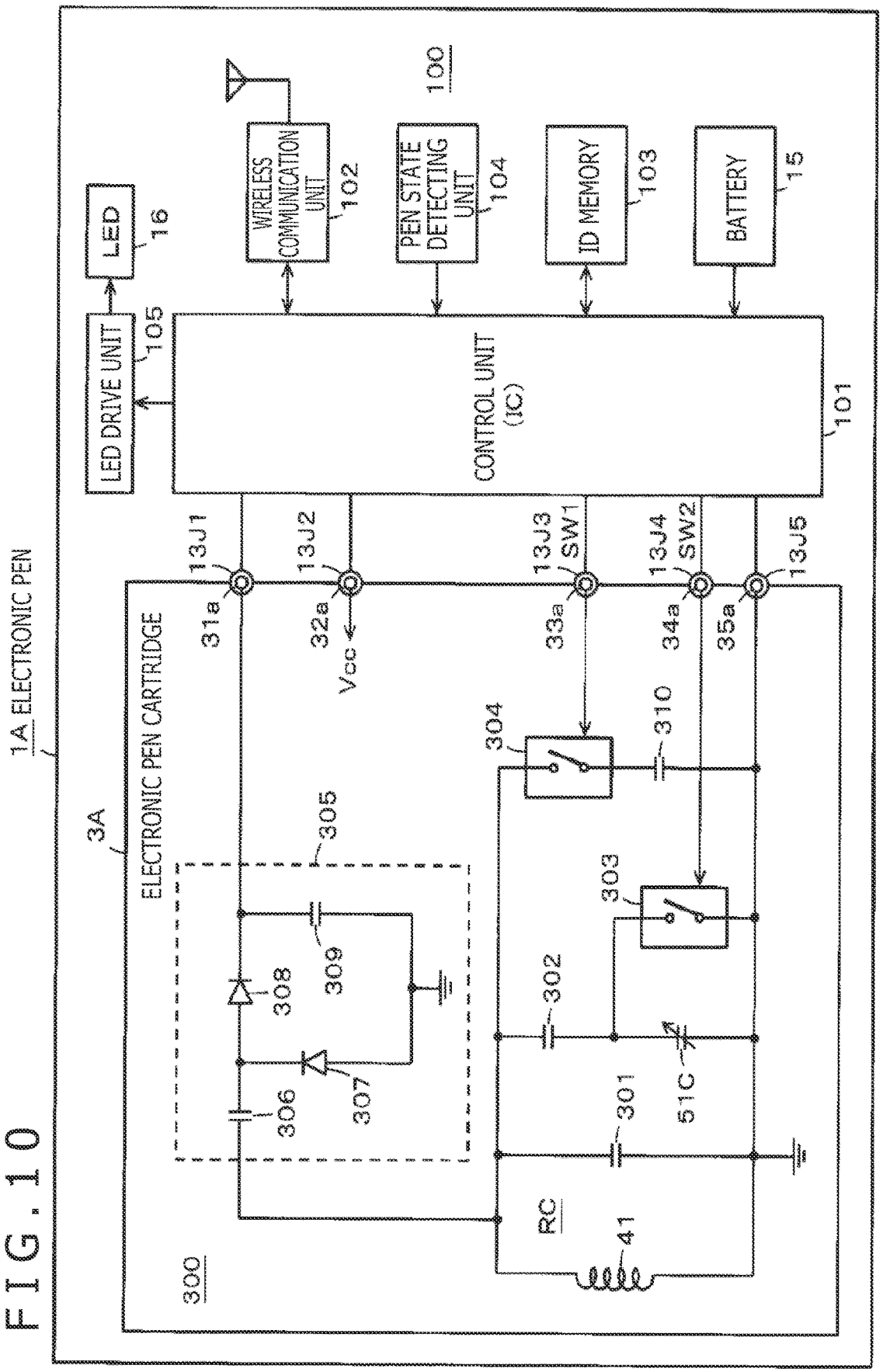
FIG. 10 is a block diagram for explaining a configuration example of an electronic circuit of another embodiment of the electronic pen according to this disclosure.

Specifically, FIG. 10 is a diagram for explaining an electronic circuit example of an electronic pen cartridge 3A of an electronic pen 1A that can carry out switching control of the resonant frequency of the resonant circuit RC. In this FIG. 10, the same part as the circuit configuration of the electronic pen cartridge 3 of the electronic pen 1 of the above-described embodiment is given the same reference numeral and description thereof is omitted.

In the electronic pen cartridge 3A of the electronic pen 1 in the example of FIG. 10, a series circuit of the switch circuit 304 and a capacitor 310 is connected to the coil 41 of the resonant circuit RC. The other configuration is the same as the circuit configuration of the electronic pen cartridge 3 of the electronic pen 1 of the above-described embodiment.

In the electronic pen cartridge 3A of the electronic pen 1A in the example of this FIG. 10, when the switch circuit 304 is in the off-state, the capacitor 310 is not connected to the resonant circuit RC and therefore its capacitance is ineffective. Furthermore, when the switch circuit 304 is turned on, the capacitor 310 is connected in parallel to the coil 41 and therefore the frequency of the resonant circuit RC is shifted to a frequency different from that when the switch circuit 304 is in the off-state.

In the case of the example of this FIG. 10, the position detecting device 200 transmits a shift control signal of the resonant frequency to the electronic pen 1A. When receiving this shift control signal, the control circuit 101 of the electronic pen cartridge 3A carries out on/off-control of the switch circuit 304. Furthermore, in the position detecting device 200, a band-pass filter in which the pass frequency is variable or plural band-pass filters are disposed at the subsequent stage of the receiving amplifier 234, and the pass frequency of the band-pass filter is varied or the band-pass filter is switched according to shift control of the resonant circuit RC of the electronic pen 1.

By using the electronic pen cartridge 3A of the example of FIG. 10 and transmitting the control signal of the frequency shift from the position detecting device 200 to the electronic pen cartridge 3A through a wireless communication path in the above-described manner, it becomes possible for the position detecting device 200 to simultaneously detect the positions indicated by two electronic pen cartridges 3A. It goes without saying that, in this case, the time-sharing control of the electronic pen is unnecessary.

In the case of changing the resonant frequency of the resonant circuit RC as above, by connecting plural series circuits of the switch circuit 304 and the capacitor 310 in FIG. 10 in parallel, the resonant frequency of the resonant circuit RC can be changed by the number of connected series circuits. Due to this, the number of electronic pens 1A regarding which position detection can be simultaneously carried out through the position detecting sensor 220 of the position detecting device 200 can be set to two or more.

Second Other Embodiment

The knock-system electronic pens 1 and 1A of the above-described embodiments include the knock cam mechanism circuit 10, and the state in which the pen tip side of the electronic pen cartridge 3 protrudes from the opening 2b of the pen casing 2 and the state in which the pen tip side of the electronic pen cartridge 3 is housed in the pen casing 2 are allowed to appear every time pressing-down operation of the knock bar is carried out. However, the electronic pen of this disclosure is not limited to the knock-system one using the knock cam mechanism.

FIG. 11 depicts another example of the knock-system electronic pen. In an electronic pen 1B of this example, a knock moving part 17 that moves in the axis center direction by knock operation is disposed in a hollow part 2Ba of a pen casing 2B depicted by a section. The knock moving part 17 is composed of a resin, for example, and the printed circuit board 14 and the battery 15 are disposed in a hollow part of the knock moving part 17 similarly to the above-described electronic pen 1.

A long hole 2Be and a hole 2Bf for locking in the axis center direction are formed at the part along which the knock moving part 17 moves in the axis center direction in the side circumferential surface of the pen casing 2B of the electronic pen 1B of this example. Furthermore, in the knock moving part 17, two protrusions 17a and 17b that protrude in a direction orthogonal to the axis center direction are disposed at different positions in the axis center direction in the state of being lined up in the axis center direction. As depicted in FIG. 11, the protrusion 17a enters the long hole 2Be of the pen casing 2B in the state of being slidable in the long hole 2Be and the protrusion 17b is configured to be capable of entering the hole 2Bf for locking.

Moreover, a ring-shaped protrusion 2Bd is disposed on the inner wall surface at a predetermined position in the axis center direction in the hollow part 2Ba of the pen casing 2B and a coil spring 18 is suspended between the ring-shaped protrusion 2Bd and the protrusion 17a of the knock moving part 17. By the coil spring 18, the knock moving part 17 is configured to be always elastically displaced toward the side of an opening 2Bc on the rear end side of the pen casing 2B. However, the knock moving part 17 is configured in such a manner that either the protrusion 17a or the protrusion 17b abuts against the wall part of the long hole 2Be or the hole 2Bf for locking on the rear end side and the knock moving part 17 is locked so as not to drop off from the opening 2Bc on the rear end side of the pen casing 2B.

In this case, as depicted in FIG. 11, the protrusion height is set lower in the protrusion 17b on the rear end side than the protrusion height of the protrusion 17a on the pen tip side. Furthermore, the protrusion height of the protrusion 17b on the rear end side is set to such a height that, when the protrusion 17a is pressed down toward the direction that is orthogonal to the axis center direction and is toward the hollow part 2Ba of the pen casing 2B, the engagement between the protrusion 17b and the hole 2Bf for locking is released and the knock moving part 17 can move in the axis center direction in the hollow part 2Ba of the pen casing 2B.

Moreover, in this example, a connector jack 17J into which the connector plug 3P of the electronic pen cartridge 3 is inserted to be joined thereto is disposed at the end part of the knock moving part 17 on the pen tip side in the axis center direction. The electronic pen cartridge 3 is inserted from an opening 2Bb of the pen casing 2B and thereby its connector plug 3P is inserted into the connector jack 17J of the knock moving part 17 to be joined thereto. Thereby, the electronic pen cartridge 3 is joined to the knock moving part 17.

The state of FIG. 11 depicts the state in which a rear end side 17c of the knock moving part 17 has been pressed down by a user in the electronic pen 1B of this example, and depicts the state in which the knock moving part 17 has moved toward the pen tip side against the elasticity of the coil spring 18 and the protrusion 17b enters the hole 2Bf for locking to engage with it and thereby the knock moving part 17 is locked. In this state, the side of the tip 30a of the core body 30 of the electronic pen cartridge 3 becomes the state of protruding to the external through the opening 2Bb of the pen casing 2B.

When the protrusion 17a is pressed down in the state of this FIG. 11, the engagement of the protrusion 17b with the hole 2Bf for locking is released and the knock moving part 17 moves toward the rear end side of the pen casing 2B due to the elasticity of the coil spring 18, so that the protrusion 17a engages with the wall part of the long hole 2Be of the pen casing 2B on the rear end side and the movement of the knock moving part 17 is locked. At this time, the tip 30a of the core body 30 of the electronic pen cartridge 3 is also housed in the hollow part 2Ba of the pen casing 2B and the rear end side 17c of the knock moving part 17 protrudes from the opening 2Bc of the pen casing 2B on the rear end side to a larger extent than the state of FIG. 11. When the rear end side 17c of the knock moving part 17 is pressed down in this state, the state depicted in FIG. 11 is obtained.

Also in the electronic pen 1B of the example of this FIG. 11, the same operation and effects as the above description are achieved.

Third Other Embodiment

Figure 12A:
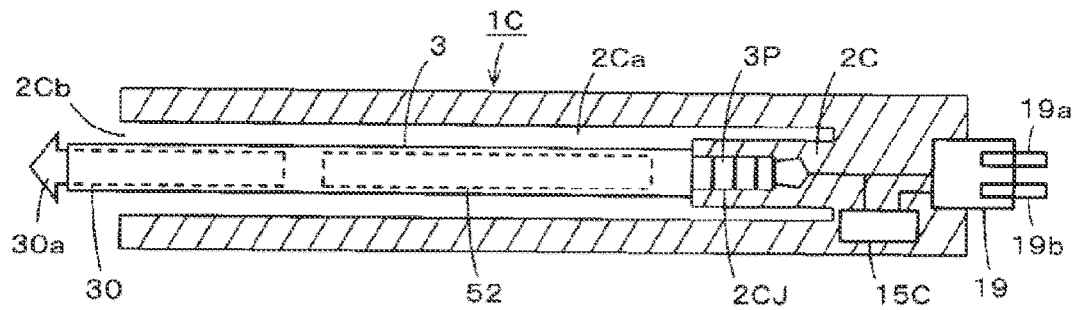
FIGS. 12A, 12B, and 12C illustrate diagrams for explaining configuration examples of an electronic pen according to an embodiment this disclosure.
Figure 12B:
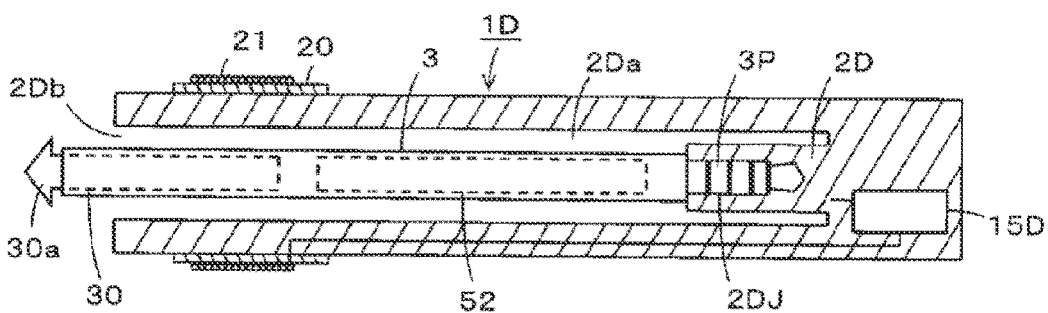
Figure 12C:
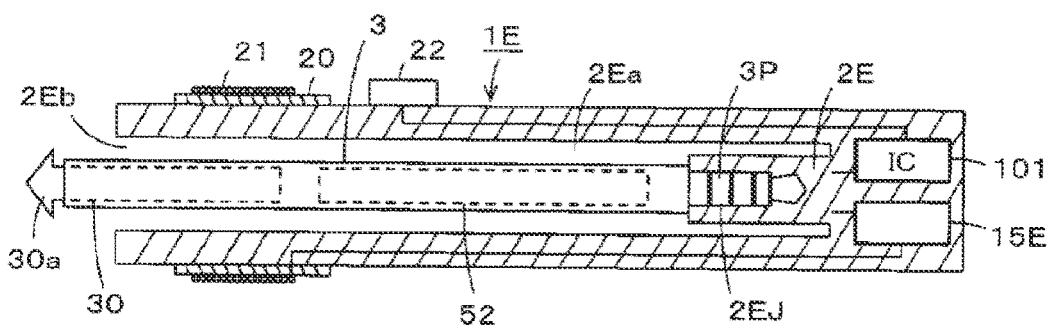

The electronic pen according to this disclosure is not limited to the knock-system configuration like the above ones. FIGS. 12A, 12B, and 12C illustrate diagrams schematically depicting examples of an electronic pen configured in such a manner that a connector jack is not disposed at a part that moves in a hollow part of a pen casing differently from the knock-system electronic pens described above and a connector jack is disposed on the rear end side of the pen casing itself.

FIGS. 12A, 12B, and 12C are schematic diagrams of electronic pens 1C, 1D, and 1E, respectively, of three examples configured in such a manner that a connector jack is disposed on the rear end side of a pen casing itself and are what depict the respective pen casings 2C, 2D, and 2E as a section.

As depicted in FIGS. 12A, 12B, and 12C, an opening is not formed on the rear end side of the pen casings 2C, 2D, and 2E of the electronic pens 1C, 1D, and 1E and connector jacks 2CJ, 2DJ, and 2EJ into which the connector plug 3P of the electronic pen cartridge 3 is inserted to be joined thereto are disposed on the rear end side of hollow parts 2Ca, 2Da, and 2Ea. Furthermore, in the electronic pens 1C, 1D, and 1E of this example, rechargeable batteries 15C, 15D, and 15E are disposed at the rear end parts of the pen casings 2C, 2D, and 2E. In addition, although diagrammatic representation is omitted, the same electronic circuit 100 as the above-described electronic pen 1 is disposed and contact terminals of the connector jacks 2CJ, 2DJ, and 2Ej are connected to the control circuit 101 thereof.

Moreover, as depicted in FIGS. 12A, 12B, and 12C, in the electronic pens 1C, 1D, and 1E, the configuration is made in such a manner that the side of the tip 30a of the core body 30 of the electronic pen cartridge 3 becomes the state of protruding to the external through openings 2Cb, 2db, and 2Eb of the pen casings 2C, 2D, and 2E when the connector plug 3P of the electronic pen cartridge 3 is inserted into and joined to the connector jacks 2CJ, 2DJ, and 2EJ on the rear end side of the hollow parts 2Ca, 2Da, and 2Ea of the pen casings 2C, 2D, and 2E.

Furthermore, in the electronic pen 1C of the first example, as depicted in FIG. 12A, terminals 19a and 19b of a charging terminal 19 are disposed at the rear end part of the pen casing 2C in the state of being exposed to the external. A contact of a dedicated charger is connected to the charging terminal 19 and the battery 15C is configured to be charged by this dedicated charger.

Moreover, in the electronic pen 1D of the second example, as depicted in FIG. 12B, a core 20 is fitted and attached to the outer circumferential side surface of the pen casing 2D and a coil 21 for charging is disposed through being wound around the core 20. Furthermore, in the electronic pen 1D of this example, a configuration is employed in which electromagnetic energy supplied from the external is received by the coil 21 for charging and the battery 15D is charged.

In addition, in the electronic pen 1E of the third example, as depicted in FIG. 12C, on the outer circumferential side surface of the pen casing 2E, the core 20 around which the coil 21 for charging is wound is disposed and a side switch 22 is disposed. Furthermore, the side switch 22 is connected to the control circuit 101 of the electronic circuit 100 disposed in the pen casing 2E. In the electronic pen 1E of the third example, the control circuit 101 is configured to wirelessly transmit also operation information of the side switch 22 to the position detecting device 200.

Also in the electronic pens 1C, 1D, and 1E depicted in these FIGS. 12A, 12B, and 12C, the same operation and effects as the operation and effects of the electronic pen 1 of the above-described embodiment are obtained.

In the description of the examples of FIGS. 12A, 12B, and 12C, it is assumed that the same electronic circuit 100 as the electronic pen 1 of the above-described embodiment is disposed in the pen casings 2C, 2D, and 2E. However, all constituent elements of the electronic circuit 100 do not need to be disposed and the electronic circuit disposed in the pen casings 2C, 2D, and 2E may be what is composed of only the battery 15C or 15D or only the battery 15E and the control circuit 101 as depicted in FIGS. 12A, 12B, and 12C.

Fourth Other Embodiment

In the electronic pens of the above-described embodiments, the connector plug is disposed in the electronic pen cartridge. However, the connector jack may be disposed on the electronic pen cartridge side. Furthermore, the electronic pens of the above-described embodiments are the cases of the electronic pen of the electromagnetic coupling system. However, this disclosure can be applied also to the electronic pen of the capacitive coupling system.

Figure 13A:
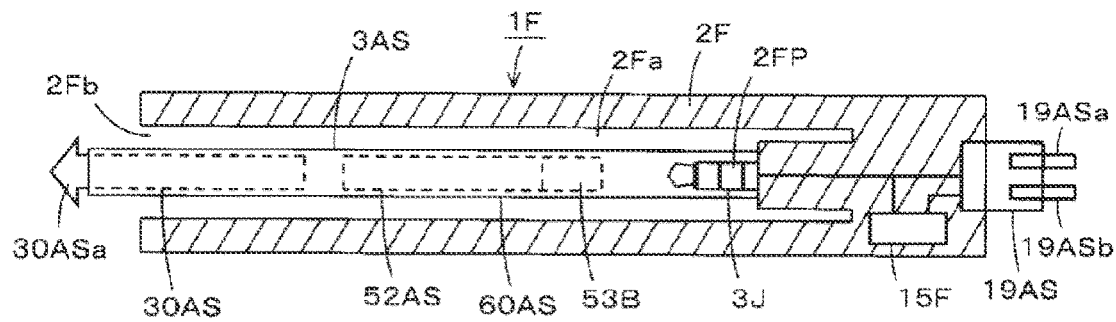
FIGS. 13A, 13B, and 13C illustrates diagrams for explaining configuration examples of an electronic pen according to an embodiment of this disclosure.
Figure 13B:
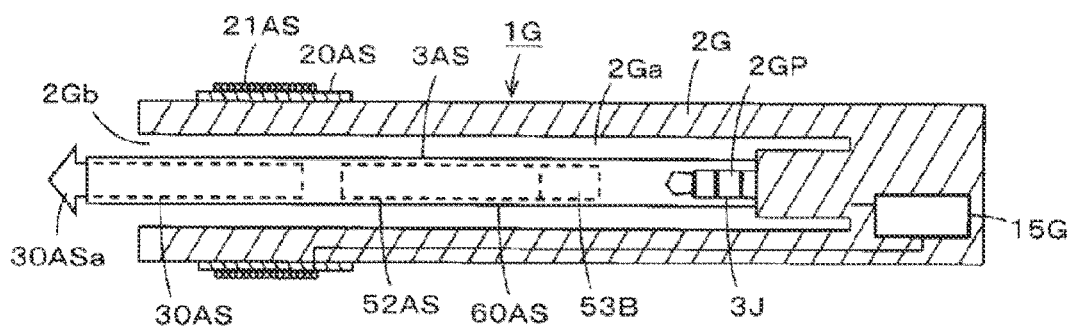
Figure 13C:
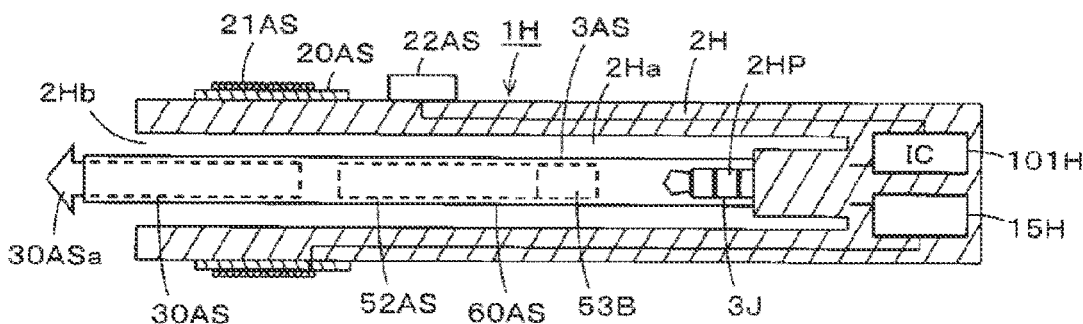

FIGS. 13A, 13B, and 13C illustrate examples of the case in which the connector jack is disposed on the electronic pen cartridge side and this disclosure is applied to an electronic pen of a capacitive coupling system. The examples in which the connector jack is disposed on the electronic pen cartridge side can be applied also to the case of the above-described knock-system electronic pen, obviously. However, the examples depicted in FIGS. 13A, 13B, and 13C are what depict schematic diagrams of examples in which the electronic pen cartridge is fixedly attached to the pen casing similarly to the examples depicted in FIGS. 12A, 12B, and 12C. Furthermore, as depicted in FIGS. 13A, 13B, and 12C, in this example, electronic pens 1F, 1G, and 1H of three examples will be described as what correspond to the configuration examples depicted in FIGS. 12A, 12B, and 12C.

In this example, as depicted in FIGS. 13A, 13B, and 13C, an electrically-conductive core body 30AS is disposed in an electronic pen cartridge 3AS. In addition, in a cartridge casing 60AS, a printed circuit board 52AS on which an electronic circuit including a signal generating circuit that supplies a signal to be sent out to a position detecting sensor of a position detecting device of the capacitive coupling system through the core body 30AS is disposed is set. Furthermore, in the examples of FIGS. 13A, 13B, and 13C, a rechargeable battery 53B that provides a supply voltage to the signal generating circuit disposed on the printed circuit board 52AS and so forth is disposed in the electronic pen cartridge 3AS.

Furthermore, on the opposite side to the pen tip side of the electronic pen cartridge 3AS, a connector jack 3J with contact terminals to which the electronic circuit on the printed circuit board 52AS and the battery 53B are connected is formed. In FIGS. 13A, 13B, and 13C, although diagrammatic representation is omitted, a writing pressure detecting circuit to which an end part of the core body 30AS is fitted and that detects the writing pressure applied to the core body 30AS is disposed in the electronic pen cartridge 3AS.

In this example, as depicted in FIGS. 13A, 13B, and 13C, an opening is not formed on the rear end side of pen casings 2F, 2G, and 2H of the electronic pens 1F, 1G, and 1H and connector plugs 2FP, 2GP, and 2HP inserted into and joined to the connector jack 3J of the electronic pen cartridge 3 are disposed on the rear end side of hollow parts 2Fa, 2Ga, and 2Ha.

Furthermore, in the electronic pens 1F, 1G, and 1H of this example, rechargeable batteries 15F, 15G, and 15H are disposed at the rear end parts of the pen casings 2F, 2G, and 2H, and these batteries 15F, 15G, and 15H are connected to terminal parts including circular annular conductor contact parts in the connector plugs 2FP, 2GP, and 2HP.

Moreover, in the electronic pen 1H of the example of FIG. 13C, a control circuit 101H formed of an IC is disposed on the rear end side of the pen casing 2H. In addition, a side switch 22AS is disposed. In addition, although diagrammatic representation is omitted, in the electronic pen 1H of this example, a wireless communication circuit that carries out wireless communication of the Bluetooth (registered trademark) standard, for example, is disposed to be connected to the control circuit 101H. This wireless communication circuit is what is for carrying out wireless communication between the electronic pen 1H and the position detecting device of the capacitive coupling system similarly to the above-described embodiments. Furthermore, the control circuit 101H is connected to the terminal parts including the circular annular conductor contact parts in the connector plugs 2FP, 2GP, and 2HP.

Furthermore, as depicted in FIGS. 13A, 13B, and 13C, in the electronic pens 1F, 1G, and 1H, the configuration is made in such a manner that the side of a tip 30ASa of the core body 30AS of the electronic pen cartridge 3AS becomes the state of protruding to the external through openings 2Fb, 2Gb, and 2Hb of the pen casings 2F, 2G, and 2H when the connector jack 3J of the electronic pen cartridge 3AS is inserted and joined to the connector plugs 2FP, 2GP, and 2HP on the rear end side of the hollow parts 2Fa, 2Ga, and 2Ha of the pen casings 2F, 2G, and 2H.

Moreover, in the electronic pen IF of the first example, as depicted in FIG. 13A, terminals 19ASa and 19ASb of a charging terminal 19AS are disposed at the rear end part of the pen casing 2F in the state of being exposed to the external. A contact of a dedicated charger is connected to the charging terminal 19AS and the battery 15F and the battery 53B of the electronic pen cartridge 3AS are configured to be charged by this dedicated charger.

Furthermore, in the electronic pen 1G of the second example, as depicted in FIG. 13B, a core 20AS is fitted and attached to the outer circumferential side surface of the pen casing 2G and a coil 21AS for charging is disposed through being wound around the core 20AS. In addition, in the electronic pen 1G of this example, a configuration is employed in which electromagnetic energy supplied from the external is received by the coil 21AS for charging and the battery 15G is charged. The battery 53B of the electronic pen cartridge 3AS is charged by the voltage of the battery 15G.

In addition, in the electronic pen 1H of the third example, as depicted in FIG. 13C, on the outer circumferential side surface of the pen casing 2H, the core 20AS around which the coil 21AS for charging is wound is disposed and a side switch 22AS is disposed. Furthermore, the side switch 22AS is connected to the control circuit 101H disposed in the pen casing 2H. In the electronic pen 1H of the third example, the control circuit 101H is configured to wirelessly transmit also operation information of the side switch 22AS to the position detecting device of the capacitive coupling system. Also in the electronic pen 1H of this example, a configuration is employed in which electromagnetic energy supplied from the external is received by the coil 21AS for charging and the battery 15H is charged. The battery 53B of the electronic pen cartridge 3AS is charged by the voltage of the battery 15H.

Also in the electronic pens 1F, 1G, and 1H depicted in these FIGS. 13A, 13B, and 13C, the same operation and effects as the operation and effects of the electronic pen 1 of the above-described embodiment are obtained.

In the electronic pens 1F, 1G, and 1H of the capacitive coupling system of the above-described FIGS. 13A, 13B, and 13C, the electronic pen cartridge 3AS includes the rechargeable battery 53B. However, without disposing the battery 53B, the electronic pen cartridge 3AS may receive provision of the supply voltage from the batteries 15F, 15G, and 15H disposed in the pen casings 2F, 2G, and 2H through the connector jack and the connector plug.

Moreover, in the electronic pen 1H of the example of FIG. 13C, similar to the electronic pen 1 of the above-described embodiment, a pen ID memory may be disposed to be connected to the control circuit 101H and the relevant pen ID may be notified to the position detecting device through a wireless communication circuit. In this case, similarly to the electronic pen 1 of the above-described embodiment, positions indicated by two electronic pens can be detected in the position detecting device substantially simultaneously by carrying out on/off-control of operation of a signal generating circuit of the electronic pen cartridge 3AS by a time-sharing control signal from the position detecting device side through the wireless communication circuit.

Furthermore, in the electronic pen 1H of the example of FIG. 13C, it is also possible that a receiving part that detects a signal sent out from the position detecting sensor of the position detecting device is disposed in the electronic pen cartridge 3AS or the pen casing and the control circuit 101H detects the signal level of the signal received by the receiving part and detects the in-range and out-of-range states to wirelessly transmit a detection signal thereof to the position detecting device. In this case, the signal from the position detecting sensor may be received by switching the use purpose of the core body 30AS of the electronic pen cartridge 3AS between for transmission and for reception in a time-sharing manner, for example. In addition, monitoring of the received signal may be allowed by disposing a conductor for reception on the pen tip side of the pen casing and connecting this conductor for reception to the control circuit 101H.

Moreover, in the electronic pen 1H of the example of FIG. 13C, a frequency signal from an oscillation circuit is used as the signal from the electronic pen cartridge 3AS and the writing pressure is transmitted to the position detecting device by changing the oscillation frequency of the frequency signal by a variable-capacitance capacitor formed of the writing pressure detecting circuit. In this case, a control circuit that disables the variable-capacitance capacitor formed of the writing pressure detecting circuit is disposed in the electronic pen cartridge 3AS. In addition, the position detecting device sends a control signal for writing pressure zero adjustment to the electronic pen 1H through the wireless communication circuit similarly to the case of the example of the above-described electronic pen 1. Thereby, writing pressure zero adjustment can be carried out similarly to the above description.

Other Modification Examples

In the above-described embodiments, the configurations are employed in which one electronic pen cartridge is disposed in the hollow part of the pen casing. However, it is also possible to employ a structure in which plural electronic pen cartridges are attached to the inside of a pen casing in the electronic pen according to this disclosure by employing a configuration similar to what is generally called a multi-colored ballpoint pen.

Furthermore, in this kind of multi-colored ballpoint pen structure, a configuration using one electronic pen cartridge and a ballpoint pen cartridge may be employed.

DESCRIPTION OF REFERENCE SYMBOLS 1, 1B, 1C, 1D, 1E, 1F, 1G, 1H . . . Electronic pen, 2, 2C, 2D, 2E, 2F, 2G, 2H . . . Pen casing, 3, 3AS . . .

Electronic pen cartridge, 3P, 2FP, 2GP, 2HP . . . Connector plug, 13J, 17J, 3J . . . Connector jack, 15, 15C, 15D, 15E, 15F, 15G, 15H . . . Battery, 30, 30AS . . . Core body, 41 . . . Coil, 51 . . . Writing pressure detecting circuit, 52 . . . Printed circuit board, 100 . . . Electronic circuit, 101 . . . Control circuit, 102, 210 . . . Wireless communication circuit, 103 . . . ID memory, 104 . . . Pen state detecting circuit Printed, 200 . . . Position detecting device, 220 . . . Position detecting sensor

The invention claimed is:

1. An electronic pen cartridge housed in an outer electronic pen casing in which an opening is made on a first side at one end of the outer electronic pen casing in an axis center direction of the electronic pen cartridge, the electronic pen cartridge comprising:
a cartridge casing that is different from the outer electronic pen casing and is configured to be disposed within the outer electronic pen casing;
a pen tip coupled to the cartridge casing at a first end of the cartridge casing and configured to protrude outside of the outer electronic pen casing through the opening,
a first electronic circuit disposed inside of the cartridge casing and which, in operation, transfers signals to a position detecting sensor, and
a first connector that is coupled to the cartridge casing at a second end of the cartridge casing opposite the first end of the cartridge casing, that is electrically connected to the first electronic circuit, and that is configured to be joined to a second connector that is electrically connected to a second electronic circuit disposed inside of the outer electronic pen casing on a second side of the outer electronic pen casing, wherein:
the first connector includes plural first terminals insulated from each other, and each of the plural first terminals is electrically connected to the first electronic circuit, and
the first connector and the second connector are joined through insertion of a fitting protrusion of a first one of the first connector and the second connector into a fitting recess of a second one of the first connector and the second connector in the axis center direction of the outer electronic pen casing, and conductor contacts are included in the first connector or the second connector.

2. The electronic pen cartridge according to claim 1, wherein:
the first connector includes the fitting protrusion and the first plural terminals include circular annular conductor contacts,
each of the circular annular conductor contacts has a same central position, and
the circular annular conductor contacts are disposed at different positions in the axis center direction of the outer electronic pen casing.

3. The electronic pen cartridge according to claim 1, wherein:
the second connector includes the fitting protrusion,
plural second terminals of the second connector include circular annular conductor contacts,
each of the circular annular conductor contacts has a same central position,
the circular annular conductor contacts are disposed at different positions in the axis center direction of the outer electronic pen casing, and
the first plural terminals of the first connector contact the circular annular conductor contacts of the second plural terminals of the second connector.

4. The electronic pen cartridge according to claim 1, wherein:
the first electronic circuit, in operation, receives a signal from the position detecting sensor and generates information indicating a signal level of the signal received, and
the plural first terminals of the first connector include a terminal that sends the information indicating the signal level to outside of the electronic pen cartridge through the first connector.

5. The electronic pen cartridge according to claim 1, wherein:
the first electronic circuit includes a switch controlled by a control signal from outside of the electronic pen cartridge, and
the first plural terminals of the first connector include a terminal that transmits the control signal from outside of the electronic pen cartridge to the switch.

6. The electronic pen cartridge according to claim 1, wherein:
the first electronic circuit includes a resonant circuit which, in operation, transmits and receives alternating-current signals to and from the position detecting sensor.

7. The electronic pen cartridge according to claim 6, wherein:
the first electronic circuit includes a switch that changes a resonant frequency of the resonant circuit by a control signal from outside of the electronic pen cartridge, and
the plural first terminals of the first connector include a terminal that transmits the control signal from outside of the electronic pen cartridge to the switch.

8. The electronic pen cartridge according to claim 6, wherein:
the first electronic circuit includes a switch that turns on and off resonant operation of the resonant circuit by a control signal from outside of the electronic pen cartridge, and
the plural first terminals of the first connector include a terminal that transmits the control signal from outside of the electronic pen cartridge to the switch.

9. The electronic pen cartridge according to claim 6, further comprising:
a writing pressure detecting circuit which, in operation, detects a writing pressure applied to the pen tip as a change in capacitance of a capacitor or inductance of an inductor, wherein:
the first electronic circuit includes a switch that controls whether to include the capacitor or the inductor as part of the resonant circuit by a control signal from outside of the electronic pen cartridge, and
the plural first terminals of the first connector include a terminal that transmits the control signal from outside of the electronic pen cartridge to the switch.

10. The electronic pen cartridge according to claim 1, wherein:
the first plural terminals of the first connector include a terminal that provides a supply voltage from outside of the electronic pen cartridge to the first electronic circuit.

11. The electronic pen cartridge according to claim 1, wherein:
the first connector is a connector plug and the second connector is a connector jack, or the first connector is the connector jack and the second connector is the connector plug.

12. The electronic pen cartridge according to claim 1, wherein:
the pen tip is formed of a conductor and the first electronic circuit includes a signal generating circuit which, in operation, generates a signal sent out to the position detecting sensor through the pen tip.

13. An electronic pen comprising:
an outer electronic pen casing in which an opening is made on a first side at one end of the outer electronic pen casing in an axis center direction of the electronic pen casing; and
an electronic pen cartridge housed in the outer electronic pen casing,
wherein the electronic pen cartridge includes:
a cartridge casing that is different from the outer electronic pen casing and is configured to be disposed within the outer electronic pen casing;
a pen tip coupled to the cartridge casing at a first end of the cartridge casing and configured to protrude to outside of the electronic pen through the opening,
a first electronic circuit disposed inside of the cartridge casing and which, in operation, transfers signals to a position detecting sensor, and
a first connector that is coupled to the cartridge casing at a second end of the cartridge casing opposite the first end of the cartridge casing, that is electrically connected to the first electronic circuit, and that is joined to a second connector that is electrically connected to a second electronic circuit disposed inside of the outer electronic pen casing on a second side of the outer electronic pen casing,
wherein the first connector includes plural first terminals insulated from each other, and each of the plural first terminals is electrically connected to the first electronic circuit,
wherein the outer electronic pen casing includes:
the second connector, the second connector including plural second terminals insulated from each other,
the second electronic circuit, the second electronic circuit being electrically connected to the plural second terminals of the second connector, and
a power supply that provides a supply voltage to the second electronic circuit, and
wherein the first connector and the second connector are joined through insertion of a fitting protrusion of a first one of the first connector and the second connector into a fitting recess of a second one of the first connector and the second connector in the axis center direction of the outer electronic pen casing, and the plural first terminals or the plural second terminals include conductor contacts.

14. The electronic pen according to claim 13, wherein:
in the outer electronic pen casing, the second electronic circuit includes a communication circuit which, in operation, wirelessly communicates with the position detecting sensor.

15. The electronic pen according to claim 14, wherein:
the second electronic circuit includes a memory storing identification information that identifies the electronic pen, and the second electronic circuit includes a control circuit which, in operation, controls transmission of the identification information to the position detecting sensor through the communication circuit.

16. The electronic pen according to claim 14, wherein:
the second electronic circuit includes a posture detecting circuit which, in operation, detects a posture including a tilt and a rotation angle regarding the electronic pen, and the second electronic circuit includes a control circuit which, in operation, controls transmission of information regarding the posture detected by the posture detecting circuit to outside of the electronic pen through the communication circuit.

17. The electronic pen according to claim 13, wherein:
the second electronic circuit is activated when a signal is received from the electronic pen cartridge through the second connector.

18. The electronic pen according to claim 15, wherein:
the first electronic circuit of the electronic pen cartridge, in operation, receives a signal from the position detecting sensor and generates information indicating a signal level of the signal received, and the plural first terminals include a terminal that sends the information indicating the signal level to outside of the electronic pen through the first connector, and
the control circuit is activated when the information indicating the signal level from the electronic pen cartridge through the second connector is equal to or higher than a predetermined signal level and controls the communication circuit to transmit the identification information stored in the memory to outside of the electronic pen through the communication circuit.

19. The electronic pen according to claim 13, wherein:
the first electronic circuit includes a resonant circuit which, in operation, transmits and receives alternating-current signals to and from the position detecting sensor.

20. The electronic pen according to claim 14, wherein:
the first electronic circuit includes a resonant circuit which, in operation, transmits and receives alternating-current signals to and from the position detecting sensor and includes a switch that changes a resonant frequency of the resonant circuit through receiving a control signal, and
when the control signal is received through the communication circuit, the second electronic circuit transmits the control signal to the switch of the first electronic circuit of the electronic pen cartridge through the second connector and the first connector.

21. The electronic pen according to claim 14, wherein:
the first electronic circuit includes a resonant circuit which, in operation, transmits and receives alternating-current signals to and from the position detecting sensor and includes a switch that turns on and off resonant operation of the resonant circuit through receiving a control signal, and
when the control signal is received through the communication circuit, the second electronic circuit transmits the control signal to the switch of the first electronic circuit of the electronic pen cartridge through the second connector and the first connector.

22. The electronic pen according to claim 14, wherein:
the electronic pen cartridge includes a writing pressure detecting circuit which, in operation, detects a writing pressure applied to the pen tip as a change in capacitance of a capacitor or inductance of an inductor,
the first electronic circuit includes a resonant circuit which, in operation, transmits and receives alternating-current signals to and from the position detecting sensor and includes a switch that controls whether to include the capacitor or the inductor as part of the resonant circuit through receiving a control signal, and
when the control signal is received through the communication circuit, the second electronic circuit transmits the control signal to the switch of the first electronic circuit of the electronic pen cartridge through the second connector and the first connector.

\* \* \* \* \*